US009374192B2

(12) United States Patent
Aiba et al.

(10) Patent No.: US 9,374,192 B2
(45) Date of Patent: *Jun. 21, 2016

(54) MOBILE COMMUNICATION SYSTEM, BASE STATION APPARATUS, MOBILE STATION APPARATUS AND COMMUNICATION METHOD

(71) Applicant: SHARP KABUSHIKI KAISHA, Osaka-shi, Osaka (JP)

(72) Inventors: Tatsushi Aiba, Osaka (JP); Shohei Yamada, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 21 days.

This patent is subject to a terminal disclaimer.

(21) Appl. No.: 14/308,275

(22) Filed: Jun. 18, 2014

(65) Prior Publication Data

US 2014/0301319 A1    Oct. 9, 2014

Related U.S. Application Data

(63) Continuation of application No. 13/062,016, filed as application No. PCT/JP2009/065447 on Sep. 3, 2009, now Pat. No. 8,797,977.

(30) Foreign Application Priority Data

Sep. 4, 2008    (JP) ................................. 2008-227567

(51) Int. Cl.
*H04L 1/00*    (2006.01)
*H04L 1/16*    (2006.01)
(Continued)

(52) U.S. Cl.
CPC ............ *H04L 1/0026* (2013.01); *H04L 1/1671* (2013.01); *H04L 5/001* (2013.01); *H04L 5/0007* (2013.01); *H04L 5/14* (2013.01); *H04L 1/1812* (2013.01)

(58) Field of Classification Search
CPC ....... H04L 1/0026; H04L 5/0007; H04L 5/14; H04L 5/001; H04L 1/1671; H04L 1/1812
See application file for complete search history.

(56) References Cited

U.S. PATENT DOCUMENTS 7,961,700 B2    6/2011  Malladi et al.
8,169,953 B2    5/2012  Damnjanovic et al.
(Continued)

FOREIGN PATENT DOCUMENTS

WO    WO 2008/105316 A1    9/2008

OTHER PUBLICATIONS

Ericsson, "Carrier aggregation in LTE-Advanced", 3GPP TSG-RAN WG1 #53 bis, Jun. 30-Jul. 4, 2008, R1-082468.
LG Electronics, "Considerations on DL/UL Transmission in Asymmetric Carrier Aggregation", 3GPP TSG RAN WG1 Meeting #55, Nov. 10-14, 2008, R1-084197.
(Continued)

*Primary Examiner* — Jung Park
*Assistant Examiner* — Chuong M Nguyen
(74) *Attorney, Agent, or Firm* — Birch, Stewart, Kolasch & Birch, LLP

(57) ABSTRACT

When a base station apparatus and a mobile station apparatus communicate with each other using a wider frequency band consists of multiple carrier components, efficient communication is achieved without increasing control information (control signal) notified from the base station apparatus to the mobile station apparatus. The base station apparatus and the mobile station apparatus communicate with each other such that each of multiple uplink carrier components corresponds to each of multiple downlink carrier components or multiple downlink carrier component groups including multiple downlink carrier components.

8 Claims, 13 Drawing Sheets

(51) Int. Cl.
*H04L 5/00* (2006.01)
*H04L 5/14* (2006.01)
*H04L 1/18* (2006.01)

(56) References Cited

U.S. PATENT DOCUMENTS

| | | |
|---|---|---|
| 8,274,940 B2 | 9/2012 | Ishii et al. |
| 2006/0274712 A1 | 12/2006 | Malladi et al. |
| 2006/0280142 A1 | 12/2006 | Damnjanovic et al. |
| 2009/0073958 A1 | 3/2009 | Xu |
| 2009/0122736 A1 | 5/2009 | Damnjanovic et al. |
| 2010/0046460 A1 | 2/2010 | Kwak et al. |
| 2010/0074153 A1 | 3/2010 | Torsner et al. |
| 2010/0091708 A1 | 4/2010 | Nishikawa et al. |
| 2010/0091724 A1 | 4/2010 | Ishii et al. |
| 2010/0118803 A1 | 5/2010 | Ishii et al. |
| 2010/0128675 A1 | 5/2010 | Kishiyama et al. |
| 2010/0177654 A1 | 7/2010 | Charbit et al. |
| 2010/0215004 A1 | 8/2010 | Yoo |
| 2011/0103338 A1 | 5/2011 | Astely et al. |

OTHER PUBLICATIONS

NEC, "UL Access Scheme for LTE-Advanced", 3GPP TSG RAN1 #53-bis, Jun. 30-Jul. 4, 2008, R1-082365.

NTT DoCoMo Inc., "Proposals for LTE-Advanced Technologies", 3GPP TSG RAN WG1 Meeting #53 bis, Jun. 30-Jul. 4, 2008, RI-082575.

Panasonic, "Consideration on Multicarrier Transmission scheme for LTE-Adv uplink", 3GPP TSG RAN WG1 Meeting #53, Jun. 30-Jul. 4, 2008, pp. 1-3, R1-082398.

Qualcomm Europe, "Carrier Aggregation Operation in LTE-Advanced", 3GPP TSG RAN WG1 #54, Aug. 18-22, 2008, pp. 1-4, R1-083193.

U.S. Advisory Action issued in U.S. Appl. No. 13/062,016 on Oct. 9, 2013.

U.S. Notice of Allowance issued in U.S. Appl. No. 13/062,016 on Mar. 20, 2014.

U.S. Office Action issued in U.S. Appl. No. 13/062,016 on Jul. 24, 2013.

U.S. Office Action issued in U.S. Appl. No. 13/062,016 on Mar. 14, 2013.

MOBILE COMMUNICATION SYSTEM, BASE STATION APPARATUS, MOBILE STATION APPARATUS AND COMMUNICATION METHOD

This application is a Continuation of co-pending application Ser. No. 13/062,016 filed on Apr. 26, 2011, and for which priority is claimed under 35 U.S.C. §120, application Ser. No. 13/062,016 is the national phase of PCT International Application No. PCT/JP2009/065447 filed on Sep. 3, 2009 under 35 U.S.C. §371, which claims the benefit of priority of JP2008-227567 filed Sep. 4, 2008. The entire contents of each of the above-identified applications are hereby incorporated by reference.

TECHNICAL FIELD

The present invention relates to a mobile communication system composed of a base station apparatus and a mobile station apparatus.

BACKGROUND ART

3GPP (3rd Generation Partnership Project) is a project to discuss/create specifications of a mobile communication system based on networks of evolved W-CDMA (Wideband-Code Division Multiple Access) and GSM (Global System for Mobile Communications). In 3GPP, the W-CDMA system has been standardized as the third generation cellular mobile communication system and its services have been launched sequentially. Further, HSDPA (High-speed Downlink Packet Access) with the communication speed further increased has also been standardized and its services are launched. In 3GPP, the evolution of the third generation radio access technology (hereinafter, referred to as "LTE (Long Term Evolution)" or "EUTRA (Evolved Universal Terrestrial Radio Access)") and a mobile communication system (hereinafter, referred to as "LTE-A (Long Term Evolution-Advanced" or "Advanced-EUTRA") that utilizes a wider system bandwidth to achieve faster data transmission and reception are discussed.

As a communication system in LTE, an OFDMA (Orthogonal Frequency Division Multiple Access) system and a SC-FDMA (Single Carrier-Frequency Division Multiple Access) system that use subcarriers orthogonal to each other to perform user multiplexing are discussed. Meanwhile, in a downlink, the OFDMA system, which is a multi-carrier communication system, is proposed; in an uplink, the SC-FDMA system, which is a single-carrier communication system, is proposed.

On the other hand, it is proposed that, as a communication system in LTE-A, in a downlink, the OFDMA system be introduced, and, in an uplink, in addition to the SC-FDMA system, which is a single-carrier communication system, the OFDMA system, which is a multi-carrier communication system, and a Clustered-SC-FDMA (Clustered-Single Carrier-Frequency Domain Multiple Access, also called DFT-S-OFDM with Spectrum Division Control) system be introduced (non-patent documents 1 and 2). The SC-FDMA system examined as an uplink communication system in LTE or LTE-A has the feature of lowering a PAPR (Peak to Average Power Ratio) when transmitting data.

It is also proposed that although a frequency band used in a general mobile communication system is continuous, in LTE-A, multiple continuous/non-continuous frequency bands (hereinafter, referred to as a "carrier component" or "component carrier") be used in a composite manner and utilized (spectrum aggregation or carrier aggregation) as one wider frequency band (wider system band). Moreover, it is proposed that, in order to use more flexibly a frequency band assigned to a mobile communication system, a frequency band used in downlink communication and a frequency band used in uplink communication have different frequency bandwidths (non-patent documents 3 and 4).

Non-patent document 1: "UL Access Scheme for LTE-Advanced", 3GPP TSG RAN WG1 Meeting #53-bis, R1-082365, Jun. 30-Jul. 4, 2008.

Non-patent document 2: "Consideration on Multicarrier Transmission scheme for LTE Adv uplink", 3GPP TSG RAN WG1 Meeting #53-bis, R1-082398, Jun. 30-Jul. 4, 2008.

Non-patent document 3: "Proposals for LTE-Advanced Technologies", 3GPP TSG RAN WG1 Meeting #53-bis, R1-082575, Jun. 30-Jul. 4, 2008.

Non-patent document 4: "Carrier aggregation in LTE-Advanced", 3GPP TSG RAN WG1 Meeting #53-bis, R1-082468, Jun. 30-Jul. 4, 2008.

DISCLOSURE OF THE INVENTION

However, in a conventional technology, when using a wider system bandwidth (for example, a system bandwidth having a bandwidth of 100 MHz) consists of multiple continuous/non-continuous frequency bands (carrier components) to perform communication between the base station apparatus and the mobile station apparatus, correspondence between a frequency band used in downlink communication and a frequency band used in uplink communication is not clarified. Hence, when the mobile station apparatus uses the uplink frequency band to transmit information according to information transmitted by the base station apparatus using the downlink frequency band, it is necessary to control, by the base station apparatus, how the mobile station apparatus transmits the information using the uplink frequency band. In other words, the base station apparatus disadvantageously needs to transmit control information (control signal) to the mobile station apparatus.

FIG. 11 is a diagram showing how the base station apparatus and the mobile station apparatus use frequency bands each having a bandwidth of 100 MHz for uplink and downlink communication to perform communication. FIG. 11 also shows that the uplink frequency bands and downlink frequency bands each are composed of five frequency bands (carrier components) having a bandwidth of 20 MHz. For ease of description, the five carrier components (20 MHz) constituting the frequency band (100 MHz) used in the downlink communication are denoted as DL-1, DL-2, DL-3, DL-4 and DL-5, respectively. The carrier components (20 MHz) constituting the frequency band (100 MHz) used in the uplink communication are denoted as UL-1, UL-2, UL-3, UL-4 and UL-5, respectively.

In the conventional technology, the base station apparatus and the mobile station apparatus use the uplink frequency band (100 MHz) and the downlink frequency band (100 MHz) consists of five carrier components each having a bandwidth of 20 MHz to perform communication. Here, the mobile station apparatus cannot find which one of the carrier components (any one of UL-1, UL-2, UL-3, UL-4 and UL-5) is used to transmit uplink information corresponding to information transmitted by the base station apparatus using DL-1. For example, when the base station apparatus transmits information using DL-1, the mobile station apparatus cannot find which one of the carrier components is used to transmit the ACK/NACK for this information.

In other words, in the conventional technology, it is necessary to instruct the mobile station apparatus, with the control information (control signal) from the base station apparatus, to transmit information using which one of the carrier components in the uplink, in response to information transmitted in the downlink. For example, the base station apparatus needs to instruct the mobile station apparatus, with the control information (control signal), to transmit the ACK/NACK for the information transmitted with DL-1, using which one of the carrier components, namely, UL-1, UL-2, UL-3, UL-4 and UL-5.

This control information (control signal) from the base station apparatus to the mobile station apparatus is increased as the base station apparatus and the mobile station apparatus communicate with each other using a wider frequency band and the number of carrier components (the number of carrier components aggregated) constituting the wider frequency band is increased. When a wider frequency band is used to achieve fast transmission and reception of information between the base station apparatus and the mobile station apparatus, the number of carrier components constituting the wider frequency band is increased. Accordingly, the control information (control signal) from the base station apparatus to the mobile station apparatus is increased.

This control information (control signal) from the base station apparatus to the mobile station apparatus is produced even when the wider frequency band is constituted of multiple non-continuous frequency bands (carrier components). Even when the wider frequency band is constituted of multiple non-continuous frequency bands (carrier components) so as to achieve fast transmission and reception of information, the control information (control signal) from the base station apparatus to the mobile station apparatus is increased according to the number of carrier components.

Furthermore, this control information (control signal) is produced even when the bandwidths of a downlink frequency band and the bandwidths of an uplink frequency band used when the base station apparatus and the mobile station apparatus communicate with each other are different from each other. For example, even when the base station apparatus uses a 100 MHz frequency band consists of five carrier components each having a bandwidth of 20 MHz to transmit information, and the mobile station apparatus transmits the ACK/NACK for information received with a 60 MHz frequency band consists three carrier components each having a bandwidth of 20 MHz, the control information (control signal) from the base station apparatus to the mobile station apparatus is produced. The control information (control signal) is increased according to the number of carrier components constituting the downlink frequency bands and the number of carrier components constituting the uplink frequency bands.

The present invention is achieved in view of the foregoing situation; an object of the present invention is to provide a mobile communication system, a base station apparatus, a mobile station apparatus and a communication method that can achieve effective information communication without increasing control information (control signal) notified from the base station apparatus to the mobile station apparatus when the base station apparatus and the mobile station apparatus communicate with each other using a wider frequency band consists of multiple carrier components.

(1) To achieve the above object, the following means are taken in the present embodiment. A mobile communication system of the present embodiment is the one in which a base station apparatus and a mobile station apparatus communicate on multiple component carriers which are aggregated, wherein the base station apparatus and the mobile station apparatus communicate such that each of multiple uplink component carriers corresponds to each of multiple downlink component carriers or each of multiple downlink component carrier groups, and the downlink component carrier group consists of multiple downlink component carriers.

(2) Further, the mobile communication system of the present invention is characterized in that the base station apparatus and the mobile station apparatus communicate using any one pair of the downlink component carrier and the uplink component carrier corresponding to each other.

(3) Further, the mobile communication system of the present invention is characterized in that the base station apparatus transmits on each of the multiple downlink component carriers or each of the multiple downlink component carrier groups, to the mobile station apparatus, uplink transmission permission signals in a same subframe, and the mobile station apparatus performs on each of the multiple uplink component carriers, data transmission to the base station apparatus in the same subframe according to the multiple uplink transmission permission signals.

(4) Further, the mobile communication system of the present invention is characterized in that the base station apparatus transmits on each of the multiple downlink component carriers or each of the multiple downlink component carrier groups, to the mobile station apparatus, uplink transmission permission signals in a same subframe, the base station apparatus transmits in a same subframe, to the mobile station apparatus, multiple PHICHs for data transmitted from the mobile station apparatus on each of the multiple uplink component carriers, and the mobile station apparatus performs on each of the multiple uplink component carriers, data transmission to the base station apparatus in the same subframe according to the multiple uplink transmission permission signals.

(5) Further, the mobile communication system of the present invention is characterized in that the number of uplink transmission permission signals transmitted from the base station apparatus in the same subframe is equal to that of uplink component carriers.

(6) Further, the mobile communication system of the present invention is characterized in that the number of pieces of data transmitted from the mobile station apparatus in the same subframe is equal to that of uplink component carriers.

(7) Further, the mobile communication system of the present invention is characterized in that the number of PHICHs transmitted from the base station apparatus in the same subframe is equal to that of uplink component carriers.

(8) Further, the mobile communication system of the present invention is characterized in that the data transmitted from the mobile station apparatus in the same subframe is transmitted using a physical uplink shared channel.

(9) Further, the mobile communication system of the present invention is characterized in that the data transmitted from the mobile station apparatus in the same subframe is transmitted using a physical uplink control channel.

(10) Further, the mobile communication system of the present invention is characterized in that the mobile station apparatus performs, in the same subframe, uplink data transmission on a physical uplink shared channel and control data transmission on a physical uplink control channel.

(11) Further, the mobile communication system of the present invention is characterized in that the control data transmitted with the uplink data in the same subframe is information indicating the ACK/NACK for downlink data.

(12) Further, the mobile communication system of the present invention is characterized in that the control data transmitted with the uplink data in the same subframe is channel state information.

(13) Further, the mobile communication system of the present invention is characterized in that the control data transmitted with the uplink data in the same subframe is scheduling request.

(14) A mobile communication system of the present invention is also the one in which a base station apparatus and a mobile station apparatus communicate on multiple component carriers which are aggregated, wherein the mobile station apparatus transmits channel state information with respect to multiple downlink component carriers using a physical uplink control channel allocated on at least one of uplink component carriers.

(15) A mobile communication system of the present invention is also the one in which a base station apparatus and a mobile station apparatus communicate on multiple component carriers which are aggregated, wherein the mobile station apparatus transmits, to the mobile station apparatus, scheduling request for requesting transmission of uplink data with respect to multiple uplink component carriers using a physical uplink control channel allocated on at least one of uplink component carriers.

(16) A base station apparatus of the present invention is the one in a mobile communication system in which a base station apparatus and a mobile station apparatus communicate on multiple component carriers which are aggregated, wherein the base station apparatus communicates with the mobile station apparatus such that each of multiple uplink component carriers corresponds to each of multiple downlink component carriers or each of multiple downlink component carrier groups, and the downlink component carrier group consists of multiple downlink component carriers.

(17) A mobile station apparatus of the present invention is the one in a mobile communication system in which a base station apparatus and a mobile station apparatus communicate on multiple component carriers which are aggregated, wherein the mobile station apparatus communicates with the base station apparatus such that each of multiple uplink component carriers corresponds to each of multiple downlink component carriers or each of multiple downlink component carrier groups, and the downlink component carrier group consists of multiple downlink component carriers.

(18) A communication method of the present invention is the one in which a base station apparatus and a mobile station apparatus communicate on multiple component carriers which are aggregated, the base station apparatus and the mobile station apparatus communicate such that each of multiple uplink component carriers corresponds to each of multiple downlink component carriers or each of multiple downlink component carrier groups, and the downlink component carrier group consists of multiple downlink component carriers.

According to the present invention, since the base station apparatus and the mobile station apparatus communicate with each other such that each of multiple uplink carrier components corresponds to each of multiple downlink carrier components or each of multiple downlink carrier component groups including multiple downlink carrier components, it is possible to perform efficient communication without increasing the control information (control signal) notified from the base station apparatus to the mobile station apparatus.

Figure 1:
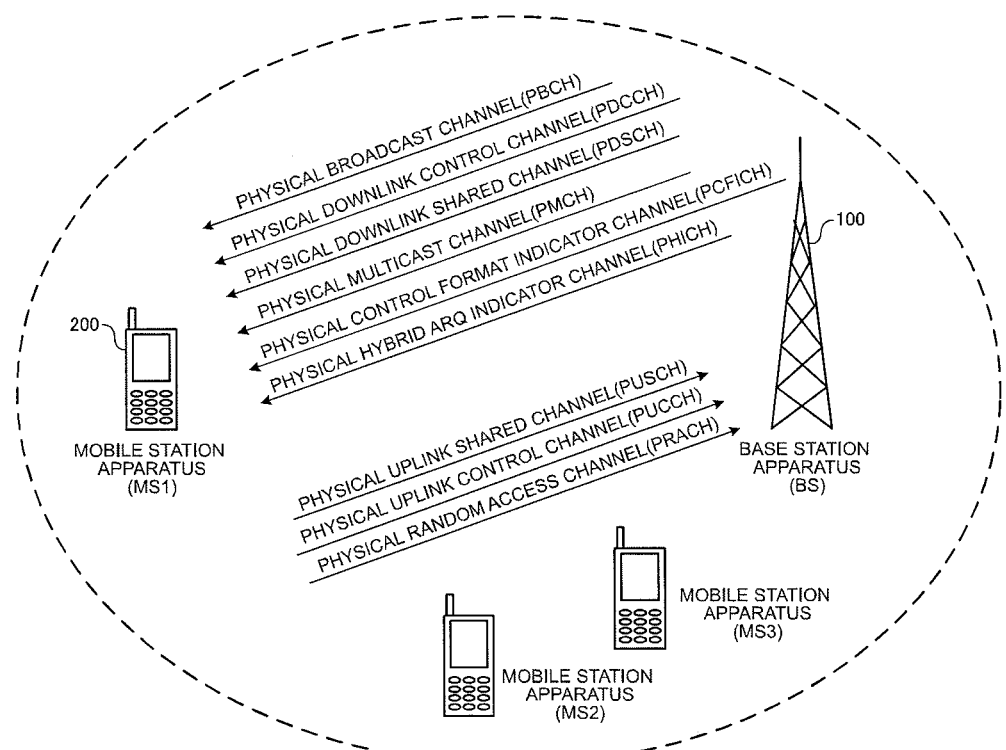
FIG. 1 is a diagram conceptually showing a configuration of a physical channel according to an embodiment of the present invention.

100 Base station apparatus
101 Data control portion
102 Transmission data modulation portion
103 Radio portion
104 Scheduling portion
105 Channel estimation portion
106 Reception data demodulation portion
107 Data extraction portion
108 Higher layer
109 Antenna
110 Radio resource control portion
200 Mobile station apparatus
201 Data control portion
202 Transmission data modulation portion
203 Radio portion
204 Scheduling portion
205 Channel estimation portion
206 Reception data demodulation portion
207 Data extraction portion
208 Higher layer
209 Antenna
210 Radio resource control portion

BEST MODES FOR CARRYING OUT THE INVENTION

Embodiments of the present invention will be described with reference to the accompanying drawings. FIG. 1 is a diagram conceptually showing an example of a configuration of a physical channel according to an embodiment of the present invention. A downlink physical channel is composed of a physical broadcast channel (PBCH), a physical downlink control channel (PDCCH), a physical downlink shared channel (PDSCH), a physical multicast channel (PMCH), a physical control format indicator channel (PCFICH) and a physical hybrid ARG indicator channel (PHICH). An uplink physical channel is composed of a physical uplink shared channel (PUSCH), a physical uplink control channel (PUCCH) and a physical random access channel (PRACH). Theses channels are transmitted and received between the base station apparatus and the mobile station apparatus.

The physical broadcast channel (PBCH) maps a broadcast channel (BC) every 40 milliseconds. The timing of 40 milliseconds is subjected to a blind detection. Specifically, explicit signaling is not performed to provide the timing. A sub-frame including the physical broadcast channel (PBCH) is self-decodable.

The physical downlink control channel (PDCCH) is a channel that is used to notify the mobile station apparatus of an uplink transmission permission, that is, resources allocation for the physical downlink shared channel (PDSCH), resources allocation for hybrid automatic repeat request (HARQ) information for downlink data and resources allocation for the physical uplink shared channel (PUSCH).

When the resources allocation for the physical downlink shared channel is included in the PDCCH, the mobile station apparatus receives data (downlink data and/or downlink control data) using the physical downlink shared channel (PDSCH) according to the resources allocation indicated by the PDCCH from the base station apparatus. In other words, the PDCCH is a signal for performing the resources allocation on the downlink (hereinafter referred to as a "downlink transmission permission signal" or also referred to as a "downlink grant"). When the resources allocation for the physical uplink shared channel is included in the PDCCH, the mobile station apparatus transmits data (uplink data and/or uplink control data) using the physical uplink shared channel (PUSCH) according to the resources allocation indicated by the PDCCH from the base station apparatus. In other words, the PDCCH is a signal for permitting data transmission on the uplink (hereinafter referred to as an "uplink transmission permission signal" or also referred to as an "uplink grant").

The physical downlink shared channel (PDSCH) is a channel that is used to transmit downlink data (downlink shared channel (DL-SCH)) or paging information (paging channel (PCH)). The physical multicast channel (PMCH) is a channel that is utilized to transmit a multicast channel (MCH); a downlink reference signal, an uplink reference signal and a physical downlink synchronization signal are separately allocated.

Here, the downlink data (DL-SCH) indicates, for example, the transmission of user data, and the DL-SCH is a transport channel. In the DL-SCH, HARQ and dynamic adaptive radio link control are supported, and beam forming is available. In the DL-SCH, dynamic resources allocation and semi-static resources allocation are supported.

The physical uplink shared channel (PUSCH) is a channel that is used to mainly transmit uplink data (uplink shared channel (UL-SCH)). In case that the base station apparatus performs scheduling on the mobile station apparatus, control data described below is also transmitted using the PUSCH. The control data includes channel state information (channel quality indicator of a down link (CQI)), a precoding matrix indicator (PMI), a rank indicator (RI), HARQ positive acknowledgement (ACK: positive acknowledgement)/negative acknowledgement (NACK) for a downlink transmission.

Here, the uplink data (UL-SCH) indicates, for example, the transmission of user data, and the UL-SCH is a transport channel. In the UL-SCH, HAQ and dynamic adaptive radio link control are supported, and beam forming is available. In the UL-SCH, dynamic resources allocation and semi-static resources allocation are supported.

The uplink data (UL-SCH) and the downlink data (DL-SCH) may include a radio resource control signal (hereinafter referred to a RRC (radio resource control) signaling) and a MAC (medium access control) control element, which are exchanged between the base station apparatus and the mobile station apparatus.

The physical uplink control channel (PUCCH) is a channel that is used to transmit control data. Here, the control data includes, for example, channel state information (CQI, PMI and RI) transmitted (fed back) from the mobile station apparatus to the base station apparatus, scheduling request (SR) for requesting resources allocation for transmitting the uplink data (requesting transmission of the UL-SCH) and the ACK/NACK of HARQ for downlink transmission.

The channel state information (CQI, PMI and RI) transmitted (fed back) from the mobile station apparatus to the base station apparatus will be described. The base station apparatus switches radio transmission parameters (hereinafter referred to as an AMC (adaptive modulation and coding) mode) such as an error correction mode, an error correction coding rate and a data modulation order according to the channel quality (reception quality) of each mobile station apparatus, and thereby can achieve more efficient communication. CQI (also referred to as channel quality information, channel quality indicator) refers to information that indicates the channel quality (reception quality) fed back from each mobile station apparatus so as to switch the AMC; the mobile station apparatus feeds back the channel quality (reception quality) indicating the quality of a signal received from the base station apparatus as the CQI to the base station apparatus.

The base station apparatus and the mobile station apparatus utilize transmission diversity such as SDM (space division multiplexing) and SFBC (space-frequency block coding) and CDD (cycle delay diversity) utilizing MIMO (multiple input multiple output), and thus it is possible to increase the capacity of a communication path. MIMO collectively refers to a multi-input/multi-output system or technology, and is characterized in that a plurality of antennas is used on transmission and reception sides to perform transmission using a plurality of branches of input and output of radio waves. The unit of a signal sequence that can be transmitted in space multiplexing utilizing the MIMO system is referred to as a stream; the number of streams requested by the mobile station apparatus at the time of MIMO communication is transmitted (fed back) as the RI (rank indicator) from the mobile station apparatus to the base station apparatus. When SDM is utilized in the downlink, in order to properly separate information of a plurality of streams transmitted from each antenna, a transmission signal sequence is previously preprocessed (this is referred to as a "precoding"). The precoding information can be calculated based on a channel status estimated by the mobile station apparatus, and it is transmitted (fed back) as the PMI (precoding matrix indicator) from the mobile station apparatus to the base station apparatus.

As described above, in order to achieve communication of optimal quality, each mobile station apparatus transmits (feed back), to the base station apparatus, the channel state information (CQI, PMI and RI) using PUCCH. For example, the mobile station apparatus can periodically transmit (feed back), to the base station apparatus, the channel state information using the PUCCH. As described above, when the base station apparatus performs scheduling, the mobile station apparatus uses the PUSCH to transmit the channel state information to the base station apparatus. For example, the mobile station apparatus can a-periodically transmit (feed back) the channel state information using the PUSCH according to the scheduling by the base station apparatus.

The physical control format indicator channel (PCFICH) is a channel that is utilized to notify the mobile station apparatus of the number of OFDM symbols used for PDCCH, and is transmitted by each sub-frame. The physical hybrid ARG indicator channel (PHICH) is a channel that is utilized to transmit the ACK/NACK of HARQ for the uplink data. The physical random access channel (PRACH) is a channel that is used to transmit a random access preamble, and has a guard time.

A communication system according to the present embodiment includes a base station apparatus 100 and a mobile station apparatuses 200.

[Base Station Apparatus]

Figure 2:
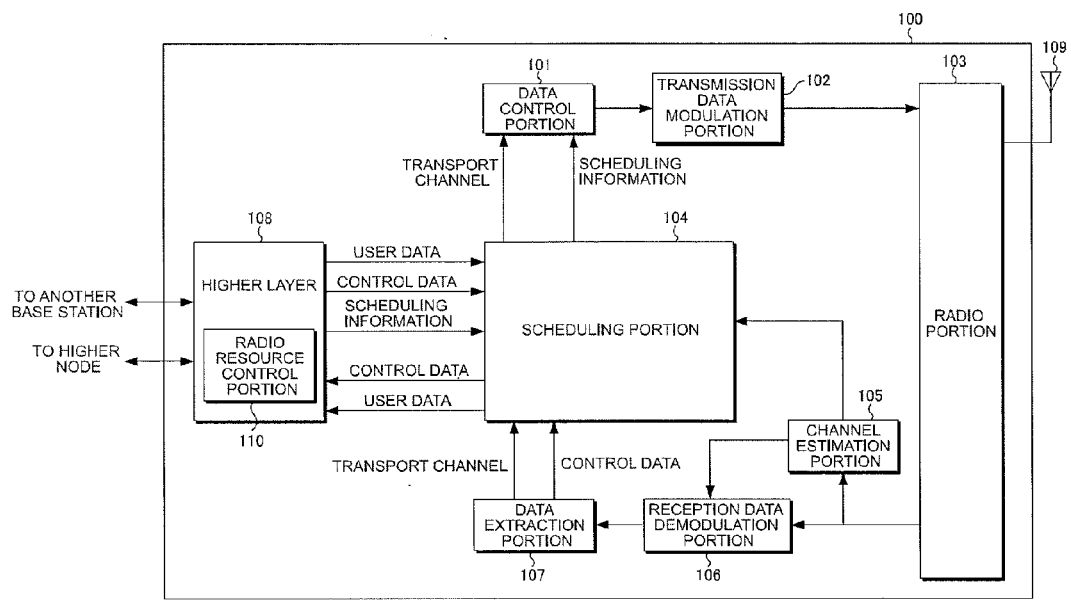
FIG. 2 is a block diagram showing a general configuration of a base station apparatus 100 according to an embodiment of the present invention.

FIG. 2 is a block diagram showing a general configuration of the base station apparatus 100 according to an embodiment of the present invention. The base station apparatus 100 includes a data control portion 101, a transmission data modulation portion 102, a radio portion 103, a scheduling portion 104, a channel estimation portion 105, a reception data demodulation portion 106, a data extraction portion 107, a higher layer 108 and an antenna 109. Here, the radio portion 103, the scheduling portion 104, the channel estimation portion 105, the reception data demodulation portion 106, the data extraction portion 107, the higher layer 108 and the antenna 109 constitute a reception portion. The data control portion 101, the transmission data modulation portion 102, the radio portion 103, the scheduling portion 104, the higher layer 108 and the antenna 109 constitute a transmission portion.

The antenna 109, the radio portion 103, the channel estimation portion 105, the reception data demodulation portion 106 and the data extraction portion 107 perform processing on a physical layer in the uplink. The antenna 109, the radio portion 103, the transmission data modulation portion 102 and the data control portion 101 perform processing on a physical layer in the downlink.

The data control portion 101 receives a transport channel from the scheduling portion 104. Based on the transport channel and scheduling information input from the scheduling portion 104, the data control portion 101 maps on the physical channel a signal and a channel generated by the physical layer. The data thus mapped is output to the transmission data modulation portion 102.

The transmission data modulation portion 102 modulates the transmission data into an OFDM system. Based on the scheduling information (downlink physical resource block (PRB) allocation information (for example, information for position of physical resource blocks consists of frequency and time)) from the scheduling portion 104 and a modulation scheme and a coding scheme corresponding to each PRB (including, for example, modulation scheme: 16QAM, coding rate: 2/3 coding rate), the transmission data modulation portion 102 performs signal processing such as data modulation, coding, an input signal serial/parallel conversion, IFFT (inverse fast Fourier transport) processing, CP (cyclic prefix) insertion and filtering on data input from the data control portion 101, and generates and outputs transmission data to the radio portion 103.

The radio portion 103 up-converts modulation data input from the transmission data modulation portion 102 to a radio frequency to generate a radio signal, and transmits it to the mobile station apparatus 200 through the antenna 109. The radio portion 103 receives an uplink radio signal from the mobile station apparatus 200 through the antenna 109, down-converts it into a base band signal and outputs the reception data to the channel estimation portion 105 and the reception data demodulation portion 106.

The scheduling portion 104 performs processing on a medium access control (MAC) layer. The scheduling portion 104 performs mapping on a logical channel and a transport channel, scheduling on the downlink and the uplink (such as HARQ processing and selection of a transport format) and the like. In the scheduling portion 104, in order to integrally control the processing portions in each physical layer, interfaces are present between the scheduling portion 104 and the antenna 109, the radio portion 103, the channel estimation portion 105, the reception data demodulation portion 106, the data control portion 101, the transmission data modulation portion 102 and the data extraction portion 107 (not shown).

For the scheduling of the downlink, based on feedback information (such as the channel state information (CQI, PMI and RI) on the uplink and the ACK/NACK information for the downlink data) received from the mobile station apparatus 200, PRB information available to each mobile station apparatus, a buffer status, scheduling information input from the higher layer 108 and the like, the scheduling portion 104 performs processing for selecting a downlink transport format (transmission form, for example, physical resource block allocation, a modulation scheme and a coding scheme) so as to modulate individual pieces of data, performs retransmission control on HARQ and generates scheduling information used in the downlink. The scheduling information used for the scheduling of the downlink is output to the data control portion 101.

For the scheduling of the uplink, based on the result of estimation of an uplink channel state (radio transport path state) output by the channel estimation portion 105, resources allocation request from the mobile station apparatus 200, PRB information available to each mobile station apparatus, scheduling information input from the higher layer 108 and the like, the scheduling portion 104 performs processing for selecting an uplink transport format (transmission form, for example, physical resource block allocation, a modulation scheme and a coding scheme) so as to modulate individual pieces of data and generates scheduling information used for the scheduling of the uplink. The scheduling information used for the scheduling of the uplink is output to the data control portion 101.

The scheduling portion 104 maps the downlink logical channel input from the higher layer 108 on the transport channel, and outputs it to the data control portion 101. The scheduling portion 104 performs processing, as necessary, on the control data input from the data extraction portion 107 and received in the uplink and the transport channel, then maps them on the uplink logical channel and outputs them to the higher layer 108.

In order to demodulate the uplink data, the channel estimation portion 105 estimates the uplink channel state from an uplink demodulation reference signal (DRS), and outputs the result of the estimation to the reception data demodulation portion 106. In order to perform uplink scheduling, the channel estimation portion 105 also estimates the uplink channel state from an uplink sounding reference signal (SRS), and outputs the result of the estimation to the scheduling portion 104.

The reception data demodulation portion 106 also acts as an OFDM demodulation portion and/or a DFT-spread- OFDM (DFT-S-OFDM) demodulation portion that demodulate the reception data modulated in the OFDM system and/or the SC-FDMA system. Based on the result of estimation of the uplink channel state input from the channel estimation portion 105, the reception data demodulation portion 106 performs signal processing such as DFT transform, sub-carrier mapping, IFFT transform and filtering on modulation data input from the radio portion 103, to perform demodulation processing, and outputs it to the data extraction portion 107.

The data extraction portion 107 checks whether or not data input from the reception data demodulation portion 106 is right or wrong, and outputs the result of the check (positive signal ACK/negative signal NACK) to the scheduling portion 104. The data extraction portion 107 separates the data input from the reception data demodulation portion 106 into a transport channel and control data on a physical layer, and outputs them to the scheduling portion 104. The separated control data includes the channel state information (CQI, PMI and RI), the ACK/NACK information and the scheduling request notified from the mobile station apparatus 200.

The higher layer 108 performs processing on a packet data convergence protocol (PDCP) layer, a radio link control (RLC) layer and a radio resource control (RRC) layer. In the higher layer 108, in order to integrally control the processing portions in a lower layer, interfaces are present between the higher layer 108 and the scheduling portion 104, the antenna 109, the radio portion 103, the channel estimation portion 105, the reception data demodulation portion 106, the data control portion 101, the transmission data modulation portion 102 and the data extraction portion 107 (not shown).

The higher layer 108 has a radio resource control portion 110 (also referred simply to as a "control portion"). The radio resource control portion 110 performs control on various types of setting information, system information, paging, the communication state of each mobile station apparatus, mobility such as handover, the buffer status of each mobile station apparatus, the connection setting of unicast and multicast bearers, a mobile station indicator (UEID) and the like. The higher layer 108 exchanges information with another base station apparatus and a higher node.

[Mobile Station Apparatus]

Figure 3:
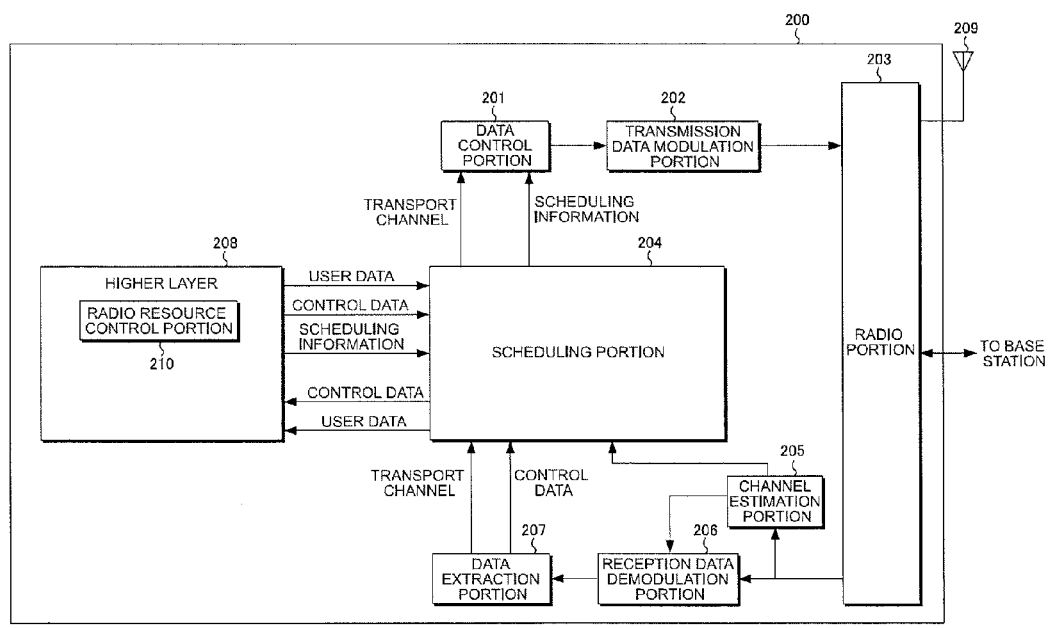
FIG. 3 is a block diagram showing a general configuration of a mobile station apparatus 200 according to an embodiment of the present invention.

FIG. 3 is a block diagram schematically showing a general configuration of the mobile station apparatus 200 according to an embodiment of the present invention. The mobile station apparatus 200 includes a data control portion 201, a transmission data modulation portion 202, a radio portion 203, a scheduling portion 204, a channel estimation portion 205, a reception data demodulation portion 206, a data extraction portion 207, a higher layer 208 and an antenna 209. Here, the data control portion 201, the transmission data modulation portion 202, the radio portion 203, the scheduling portion 204, the higher layer 208 and the antenna 209 constitute a transmission portion. The radio portion 203, the scheduling portion 204, the channel estimation portion 205, the reception data demodulation portion 206, the data extraction portion 207, the higher layer 208 and the antenna 209 constitute a reception portion.

The data control portion 201, the transmission data modulation portion 202 and the radio portion 203 perform processing on a physical layer in the uplink. The radio portion 203, the channel estimation portion 205, the reception data demodulation portion 206 and the data extraction portion 207 perform processing on a physical layer in the downlink.

The data control portion 201 receives a transport channel from the scheduling portion 204. Based on the transport channel and scheduling information input from the scheduling portion 204, the data control portion 201 maps on the physical channel a signal and a channel generated by the physical layer; based on the scheduling information input from the scheduling portion 204. The data thus mapped is output to the transmission data modulation portion 202.

The transmission data modulation portion 202 modulates the transmission data into the OFDM system and/or the SC-FDMA system. The transmission data modulation portion 202 performs, on the data input from the data control portion 201, signal processing such as data modulation, DFT (discrete Fourier transform) processing, sub-carrier mapping, IFFT (inverse fast Fourier transform) processing, CP insertion and filtering, and generates and outputs transmission data to the radio portion 203.

The radio portion 203 up-converts modulation data input from the transmission data modulation portion 202 to a radio frequency to generate a radio signal, and transmits it to the base station apparatus 100 through the antenna 209. The radio portion 203 receives a radio signal modulated with downlink data from the base station apparatus 100 through the antenna 209, down-converts it into a base band signal and outputs reception data to the channel estimation portion 205 and the reception data demodulation portion 206.

The scheduling portion 204 performs processing on a medium access control (MAC) layer. The scheduling portion 204 performs mapping on a logical channel and a transport channel, scheduling on the downlink and the uplink (such as HARQ processing and selection of a transport format) and the like. In the scheduling portion 204, in order to integrally control the processing portions in each physical layer, interfaces are present between the scheduling portion 204 and the antenna 209, the data control portion 201, the transmission data modulation portion 202, the channel estimation portion 205, the reception data demodulation portion 206, the data extraction portion 207 and the radio portion 203 (not shown). For the scheduling of the downlink, based on the scheduling information (transport format and HARQ retransmission information) from the base station apparatus 100 and the higher layer 208 and the like, the scheduling portion 204 performs reception controls on the transport channel, a physical signal and a physical channel, performs HARQ retransmission control and generates scheduling information used for downlink scheduling. The scheduling information used for the downlink scheduling is output to the data control portion 201.

For the scheduling of the uplink, based on the status of an uplink buffer input from the higher layer 208, the uplink scheduling information (such as transport format and HARQ retransmission information) from the base station apparatus 100 input from the data extraction portion 207, scheduling information input from the higher layer 208 and the like, the scheduling portion 204 performs scheduling processing for mapping an uplink logical channel input from the higher layer 208 on the transport channel and generates scheduling information used for scheduling of the uplink. With respect to the uplink transport format, information notified from the base station apparatus 100 is utilized. The scheduling information described above is output to the data control portion 201.

The scheduling portion 204 maps the uplink logical channel input from the higher layer 208 on the transport channel, and outputs it to the data control portion 201. The scheduling portion 204 also outputs to the data control portion 201 downlink channel state information (CQI, PMI and RI) input from the channel estimation portion 205 and the CRC result input from the data extraction portion 207. The scheduling portion 204 performs processing, as necessary, on the control data input from the data extraction portion 207 and received in the downlink and the transport channel, then maps them on the downlink logical channel and outputs them to the higher layer 208.

In order to demodulate the downlink data, the channel estimation portion 205 estimates the downlink channel state from a downlink reference signal (RS), and outputs the result of the estimation to the reception data demodulation portion 206. In order to notify the base station apparatus 100 of the result of the estimation of the downlink channel state (radio propagation path state), the channel estimation portion 205 estimates the downlink channel state from the downlink reference signal (RS), converts the result of the estimation into the downlink channel state information (such as CQI, PMI and RI) and outputs it to the scheduling portion 204.

The reception data demodulation portion 206 demodulates the reception data modulated in the OFDM system. Based on the result of the estimation of the downlink channel state input from the channel estimation portion 205, the reception data demodulation portion 206 performs demodulation processing on the modulated data input from the radio portion 203, and outputs it to the data extraction portion 207.

The data extraction portion 207 performs CRC on the data input from the reception data demodulation portion 206 to check whether it is right or wrong, and outputs the result of the check (positive response ACK/negative response NACK) to the scheduling portion 204. The data extraction portion 207 separates the data input from the reception data demodulation portion 206 into a transport channel and control data on a physical layer, and outputs them to the scheduling portion 204. The separated control data includes scheduling information such as downlink or uplink resources allocation and HARQ control information on the uplink.

The higher layer 208 performs processing on a packet data convergence protocol (PDCP) layer, a radio link control (RLC) layer and a radio resource control (RRC) layer. In the higher layer 208, in order to integrally control the processing portions in a lower layer, interfaces are present between the higher layer 208 and the scheduling portion 204, the antenna 209, the data control portion 201, the transmission data modulation portion 202, the channel estimation portion 205, the reception data demodulation portion 206, the data extraction portion 207 and the radio portion 203 (not shown). The higher layer 208 has a radio resource control portion 210 (also referred to as a control portion). The radio resource control portion 210 performs control on various types of setting information, system information, paging, the communication state of the own station, mobility such as handover, a buffer status, the connection setting of unicast and multicast bearers and a mobile station indicator (UEID).

First Embodiment

A first embodiment of a mobile communication system using the base station apparatus 100 and the mobile station apparatus 200 will now be described. In the mobile communication system of the present embodiment, a frequency band used in an uplink communication consists of multiple carrier components, a frequency band used in a downlink communication consists of multiple carrier components or a carrier component group including multiple carrier components and it is possible to perform communication such that each of the multiple uplink carrier components corresponds to each of the multiple downlink carrier components or each of the multiple downlink carrier component groups including the multiple downlink carrier components. In this case, with any one of groups of downlink carrier components and uplink carrier components corresponding to each other, the base station apparatus and the mobile station apparatus can communicate with each other. Although, in the present embodiment, the frequency band is defined by a bandwidth (Hz), it may be defined by the number of resource blocks consists of frequency and time.

In the present embodiment, the carrier component refers to a (narrower) frequency band used when the base station apparatus and the mobile station apparatus communicate with each other in the mobile communication system having a (wider) system band. The base station apparatus and the mobile station apparatus aggregate multiple carrier components (for example, five frequency bands each having a bandwidth of 20 MHz) (also referred to as spectrum aggregation, frequency aggregation, carrier aggregation or the like), and thus it is possible to form a (wider) system band (for example, a system band having a bandwidth of 100 MHz) and achieve fast communication (information transmission and reception). The carrier component refers to each of (narrower) frequency bands (for example, frequency bands each having a bandwidth of 20 MHz) that constitute the (wider) system band (for example, a frequency band having a bandwidth of 100 MHz). In other words, the downlink carrier component has part of the bandwidth of the frequency band that can be used by the base station apparatus, and the uplink carrier component has part of the bandwidth of the frequency band that can be used by the mobile station apparatus. The carrier components may also be defined as units of which a specific physical channel (for example, the PDCCH or the PUCCH) is composed.

The carrier components themselves that constitute the wider frequency band may be further consists of multiple carrier components. In the present embodiment, the carrier component consists of multiple carrier components (group) is referred to as a carrier component group. For example, in the present embodiment, the wider system band (for example, a system band having a bandwidth of 100 MHz) can be constituted of two carrier component groups (for example, a carrier component group having a bandwidth of 40 MHz and a carrier component group having a bandwidth of 60 MHz), and furthermore, each of these two carrier component groups can be constituted of multiple carrier components. For example, a carrier component group having a bandwidth of 40 MHz can be formed by aggregating two carrier components each having a bandwidth of 20 MHz; a carrier component group having a bandwidth of 60 MHz can be formed by aggregating three carrier components each having a bandwidth of 20 MHz.

The carrier component and the carrier component group may be allocated in a continuous frequency band or a non-continuous frequency band; a wider system band can be formed by aggregating multiple carrier components and/or carrier component groups that are a continuous frequency band and/or a non-continuous frequency band. Furthermore, the system band consists of carrier components and/or carrier component groups used in the downlink communication and the system band consists of carrier components used in the uplink communication do not need to have the same bandwidth. The base station apparatus and the mobile station apparatus can communicate with each other using a system band that has different bandwidths between the uplink and the downlink.

Figure 4:
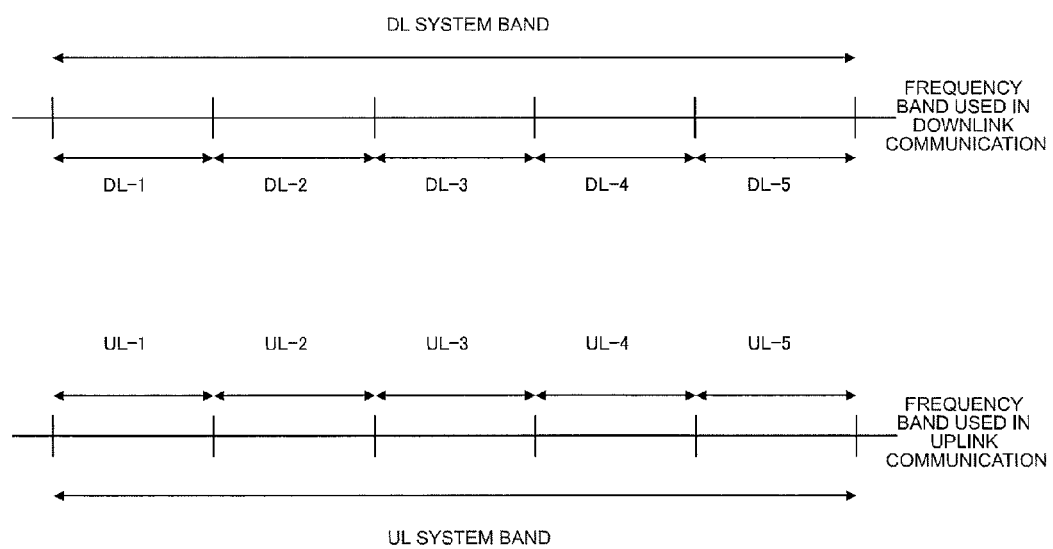
FIG. 4 is a diagram illustrating a first embodiment.

FIG. 4 is a diagram illustrating the first embodiment and showing a frequency band used in the downlink and uplink communication. FIG. 4 shows that a wider system band used in the downlink communication, that is, a system band (hereinafter referred to as a "DL system band") obtained by aggregating downlink carrier components within the system, is constituted of five carrier components (DL-1, DL-2, DL-3, DL-4 and DL-5). FIG. 5 also shows that a wider system band used in the uplink communication, that is, a system band (hereinafter referred to as a "UL system band") obtained by aggregating uplink carrier components within the system, is constituted of five carrier components (UL-1, UL-2, UL-3, UL-4 and UL-5). It can be considered that that the DL system band is constituted of DL-1, DL-2, DL-3, DL-4 and DL-5 means that the DL system band can be divided into DL-1, DL-2, DL-3, DL-4 and DL-5. It can also be considered that that the UL system band is constituted of UL-1, UL-2, UL-3, UL-4 and UL-5 means that the UL system band can be divided into UL-1, UL-2, UL-3, UL-4 and UL-5.

In the mobile communication system of the first embodiment, when the base station apparatus and the mobile station apparatus communicate with each other using the wider system band of the downlink and the uplink consist of carrier components, they can perform the communication such that each of the carrier components constituting the UL system band corresponds to one of the carrier components or one of the carrier component groups constituting the DL system band. For example the base station apparatus and the mobile station apparatus can communicate with each other such that UL-1, UL-2, UL-3, UL-4 and UL-5 correspond to DL-1, DL-2, DL-3, DL-4 and DL-5, respectively. For example, the mobile station apparatus can transmit uplink information corresponding to information transmitted from the base station apparatus using DL-1(for example, the ACK/NACK of HARQ for the downlink data transmitted using DL-1), using corresponding UL-1.

Furthermore, in the mobile communication system of the first embodiment, the mobile station apparatus can perform communication using one of the combinations of the carrier components constituting the uplink system band and one carrier component constituting the downlink system band that correspond to each other as described above.

In other words, in the mobile communication system of the first embodiment, the mobile station apparatus having capability of performing communication using the wider system band consists of carrier components, can perform communication using any of the combinations of the carrier components constituting the uplink system band and the carrier components or the carrier component groups constituting the downlink system band. Here, as described later, the mobile station apparatus having capability of performing communication using the wider system band, can also perform communication using one combination of corresponding carrier components or carrier component groups.

The mobile station apparatus having capability of performing communication using a specific plurality of combinations among the combinations of the carrier components constituting the uplink system band and the carrier components constituting the downlink system band or the carrier component groups can perform communication using the specific plurality of combinations. Here, as described below, the mobile station apparatus having capability of performing communication using a specific plurality of combinations among the combinations of the carrier components constituting the uplink system band and the carrier components constituting the downlink system band or the carrier component groups can also perform communication using one combination of corresponding carrier components.

The mobile station apparatus having capability of performing communication using only one of the combinations of the carrier components constituting the uplink system band and the carrier components constituting the downlink system band or the carrier component groups can perform communication using its combination of the carrier components.

Hereinafter, the mobile communication system in which the mobile station apparatus having capability of performing communication using the wider system band operates is also referred to as a full system, and the mobile communication system in which the mobile station apparatus having capability of performing communication using one combination of corresponding carrier components or carrier component groups operates is also referred to as a sub-system. As described above, the mobile communication system includes the full system and the sub-system, and thus it is possible to make mobile station apparatuses (mobile station apparatuses having different capabilities) using different frequency bands for communication coexist efficiently with each other using the same frequency band.

In the mobile communication system as shown in the first embodiment, its capability can be made correspond to an applicable system (such as an LTE mobile station apparatus or LTE-A mobile station apparatus). Specifically, the LTE-A (LTE-A capable) mobile station apparatus can be operated using the DL system band and the UL system band consists of multiple carrier components, and furthermore, the LTE-A (LTE-A capable) mobile station apparatus and the LTE (LTE capable) mobile station apparatus can be operated using DL-1 and UL-1 (at least one combination of carrier components or carrier component groups).

Moreover, in the mobile communication system as shown in the first embodiment, its capability can be made correspond to a release version (such as a Rel-8 mobile station apparatus, a Rel-9 mobile station apparatus or a Rel-10 mobile station apparatus) of the mobile station apparatus. Specifically, the Rel-10 mobile station apparatus can be operated using the DL system band and the UL system band consists of multiple carrier components; and furthermore, the Rel-10 mobile station apparatuses and the Rel-9 mobile station apparatuses can be operated using DL-2 and UL-2 (at least one combination of carrier components or carrier component groups), and, the Rel-10 mobile station apparatuses, the Rel-9 mobile station apparatuses and the Rel-8 mobile station apparatuses can be operated using DL-1 and UL-1 (at least one combination of carrier components or carrier component groups).

Figure 5A:
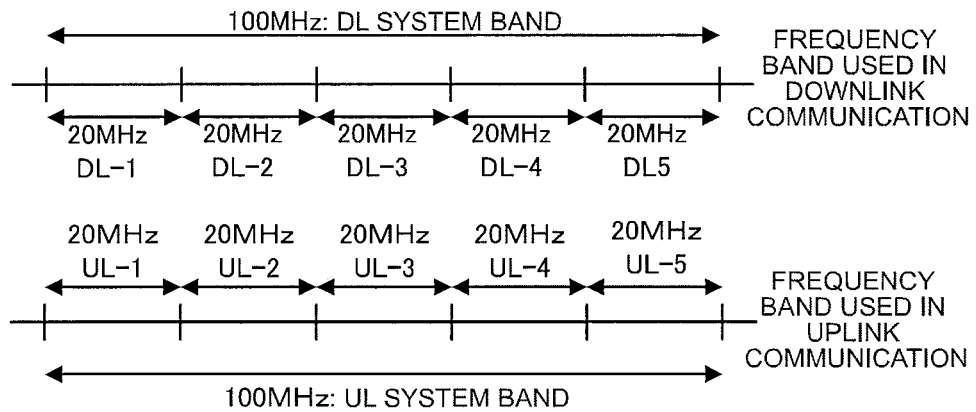
FIG. 5A is a diagram showing an example of a mobile communication system according to the first embodiment.

FIGS. 5A to 5C and FIGS. 6A and 6B are diagrams showing examples of the mobile communication system to which the first embodiment is applied. FIG. 5A shows a mobile communication system in which the bandwidth (DL system band) of the frequency band used in the downlink communication is 100 MHz and the bandwidth (UL system band) of the frequency band used in the uplink communication is 100 MHz. FIG. 5A shows that, in the mobile communication system, the DL system band is constituted of five carrier components (DL-1, DL-2, DL-3, DL-4 and DL-5) each having a bandwidth of 20 MHz and the UL system band is constituted of five carrier components (UL-1, UL-2, UL-3, UL-4 and UL-5) each having a bandwidth of 20 MHz. The base station apparatus and the mobile station apparatus can communicate with each other (transmission and reception of information) such that the five carrier components constituting the DL system band correspond to the five carrier components constituting the UL system band, respectively. For example, the base station apparatus and the mobile station apparatus can communicate with each other such that DL-1, DL-2, DL-3, DL-4 and DL-5 correspond to UL-1, UL-2, UL-3, UL-4 and UL-5, respectively, and the mobile station apparatus can transmit, using UL-1, the ACK/NACK for information (downlink data) transmitted by the base station apparatus using DL-1. Moreover, the base station apparatus can transmit, using DL-1, the ACK/NACK for information (uplink data) transmitted by the mobile station apparatus using UL-1.

Here, the mobile communication system shown in FIG. 5A can be regarded as a mobile communication system that divides the DL system band having a bandwidth of 100 MHz into multiple carrier components (consists of multiple carrier components), corresponding to the number of (five) carrier components each having a bandwidth of 20 MHz constituting the UL system band having a bandwidth of 100 MHz. The DL system band is constituted of the same number of carrier components as the carrier components constituting the UL system band, and thus it is possible to simplify the correspondence between the carrier components constituting the UL system band and the carrier components constituting the DL system band, thereby enabling an efficient communication between the base station apparatus and the mobile station apparatus. In other words, FIG. 5A shows that, in the mobile communication system, when the base station apparatus and the mobile station apparatus communicate with each other using the wider system band consists of carrier components, the DL system band is constituted of multiple carrier components (for example, the DL system band is constituted of five carrier components) according to the number (for example, five) of carrier components constituting the UL system band, and it is possible to perform a communication such that each of the carrier components correspond to each other (for example, such that the carrier components constituting the UL system band correspond to the carrier components constituting the DL system band in a direction so as to increase their frequencies).

Here, how the carrier components constituting the UL system band is made correspond respectively to the carrier components constituting the DL system band can be previously defined such as by specifications. Specifically, the correspondence between each of the carrier components constituting the UL system band and one of the carrier components constituting the DL system band can be defined such as by specifications; which of the carrier components (any one of UL-1, UL-2, UL-3, UL-4 and UL-5) the mobile station apparatus uses to transmit information according to information transmitted by the base station apparatus using DL-1 can be previously defined. For example, that communication can be performed according to the position of the frequency of each of the carrier components constituting the downlink system bands and the uplink system bands (for example, such that the carrier components constituting the downlink system bands and the uplink system bands correspond to each other in a direction so as to increase their frequencies) as described above is previously defined such as by specifications.

Also, a notification of how each of the carrier components constituting the UL system band corresponds to one of the carrier components constituting the DL system band may be given as information (control information) by the base station apparatus to the mobile station apparatus. In other words, the correspondence between each of the carrier components constituting the UL system band and one of the carrier components constituting the DL system band can be transmitted as the information (control information) from the base station apparatus to the mobile station apparatus.

For example, the base station apparatus can transmit, to the mobile station apparatus, information (hereinafter referred to as carrier component correspondence information) with respect to the correspondence between each of the carrier components of the downlink and the uplink using a broadcast channel (broadcast signal). The base station apparatus uses the broadcast channel to broadcast the carrier component correspondence information, and thereby it is possible to set the carrier component correspondence information cell-specifically for all mobile station apparatuses present within the cell that is controlled (managed) by the base station apparatus. Specifically, the base station apparatus broadcasts, to all the mobile station apparatuses present within the cell, the carrier component correspondence information using the broadcast channel; and the mobile station apparatus that has received the signal, can perform communication (transmission and reception of information) according to the carrier component correspondence information such that each of the carrier components constituting the uplink frequency band (UL system band) corresponds to one of the carrier components constituting the downlink frequency band (DL system band).

Also, for example, the base station apparatus can transmit, to the mobile station apparatus, the carrier component correspondence information using a radio resource control signal (hereinafter also referred to as a RRC signaling). The base station apparatus transmits, to the mobile station apparatus, the RRC signaling including the carrier component correspondence information, and thus it is possible to set the carrier component correspondence information the mobile station apparatus-dedicatedly. Specifically, the base station apparatus transmits, to the mobile station apparatus, the RRC signaling including the carrier component correspondence information; the mobile station apparatus that has received the signal, can perform communication (transmission and reception of information) according to the carrier component correspondence information such that each of the carrier components constituting the uplink frequency band (UL system band) corresponds to one of the carrier components constituting the downlink frequency band (DL system band).

Also, how the DL system band and/or the UL system band are constituted of the carrier components can be previously defined such as by specifications. For example, in FIG. 5A, the DL system band is constituted of five carrier components (DL-1, DL-2, DL-3, DL-4 and DL-5) each having a bandwidth of 20 MHz; as described later, the DL system band can be constituted of two carrier components, that is, a carrier component (DL-1) having a bandwidth of 40 MHz and a carrier component (DL-2) having a bandwidth of 60 MHz, or the DL system band can be constituted of three carrier components, that is, a carrier component (DL-1) having a bandwidth of 20 MHz, a carrier component (DL-2) having a bandwidth of 20 MHz and a carrier component (DL-3) having a bandwidth of 40 MHz.

Alternatively, for example, the DL system band can be constituted of a carrier component (DL-1) having a bandwidth of 60 MHz and a carrier component (DL-2) having a bandwidth of 40 MHz, or the DL system band can be constituted of a carrier component (DL-1) having a bandwidth of 30 MHz and a carrier component (DL-2) having a bandwidth of 70 MHz. How the DL system band is constituted of the carrier components can be previously defined. Likewise, for example, the UL system band can be constituted of a carrier component (UL-1) having a bandwidth of 10 MHz and a carrier component (UL-2) having a bandwidth of 30 MHz, or the UL system band can be constituted of a carrier component (UL-1) having a bandwidth of 30 MHz and a carrier component (UL-2) having a bandwidth of 10 MHz. How the UL system band is constituted of the carrier components can be previously defined.

Also a notification of how the DL system band and/or the UL system band are constituted of carrier components may be given as information (control information) by the base station apparatus to the mobile station apparatus. For example, the base station apparatus can transmit, to the mobile station apparatus, information (hereinafter referred to as wider frequency band configuration information) with respect to the configuration of a wider system band consists of carrier components, using the broadcast channel (broadcast signal). The base station apparatus uses the broadcast channel to broadcast the wide frequency band configuration information, and thus the base station apparatus can set the wider frequency band configuration information cell-specifically for all mobile station apparatuses present within the cell that is controlled (managed) by the base station apparatus. Specifically, the base station apparatus broadcast, to all mobile station apparatuses present within the cell, the wide frequency band configuration information using the broadcast channel; the mobile station apparatus that has received the signal, can perform communication (transmission and reception of information) according to the wider frequency band configuration information such that the DL system band and/or the UL system band are constituted of carrier components and that each of the carrier components constituting the uplink frequency band (UL system band) corresponds to one of the carrier components constituting the downlink frequency band (DL system band).

For example, the base station apparatus can transmit, to the mobile station apparatus, the wider frequency band configuration information using a radio resource control signal (hereinafter also referred to as the "RRC signaling"). The base station apparatus transmits, to the mobile station apparatus, the RRC signaling including the wider frequency band configuration information, and thus it is possible to set the wider frequency band configuration information the mobile station apparatus-dedicatedly. Specifically, the base station apparatus transmits, to the mobile station apparatus, the RRC signaling including the wider frequency band configuration information; the mobile station apparatus that has received the signal, can perform communication (transmission and reception of information) such that the DL system band and/or the UL system band are configured according to the wider frequency band configuration information and that each of the carrier components constituting the uplink frequency band (UL system band) corresponds to one of the carrier components constituting the downlink frequency band (DL system band).

Figure 5B:
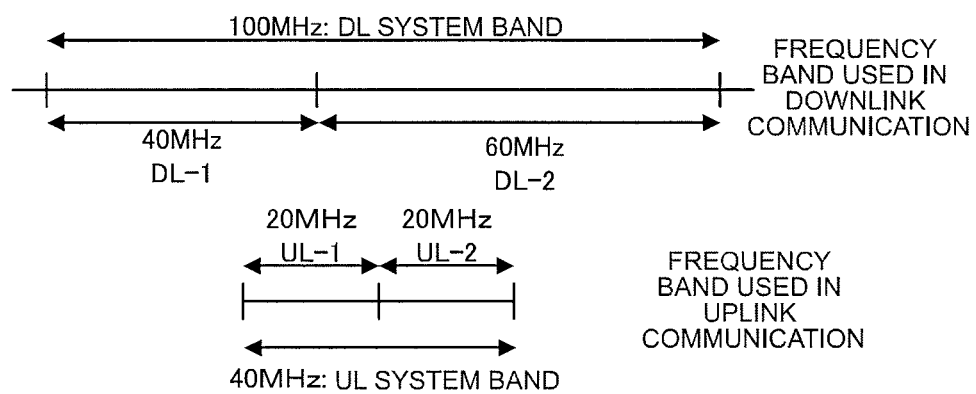
FIG. 5B is a diagram showing an example of the mobile communication system according to the first embodiment.

The configuration of a mobile communication system shown in FIG. 5B will be described. FIG. 5B shows the mobile communication system in which the bandwidth of the frequency band used in the downlink communication (DL system band) is 100 MHz and the bandwidth of the frequency band used in the uplink communication (UL system band) is 40 MHz. In the mobile communication system shown in FIG. 5B, the DL system band is constituted of two carrier components, that is, a carrier component (DL-1) having a bandwidth of 40 MHz and a carrier component (DL-2) having a bandwidth of 60 MHz, and the UL system band is constituted of two carrier components (UL-1 and UL-2) each having a bandwidth of 20 MHz. The base station apparatus and the mobile station apparatus can communicate with each other (transmission and reception of information) such that the two carrier components constituting the DL system band correspond to the two carrier components constituting the UL system band, respectively. For example, the base station apparatus and the mobile station apparatus communicate with each other such that DL-1 and DL-2 correspond to UL-1 and UL-2, respectively; and the mobile station apparatus can transmit, using UL-1, the ACK/NACK for information (downlink data) transmitted by the base station apparatus using DL-1. Moreover, the base station apparatus can transmit, using DL-1, the ACK/NACK for information (uplink data) transmitted by the mobile station apparatus using UL-1.

Here, the mobile communication system shown in FIG. 5B can also be regarded as a mobile communication system that divides a DL system band having a bandwidth of 100 MHz into multiple carrier components (consists of multiple carrier components) such that the DL system band corresponds to the number (two) of carrier components each having a bandwidth of 20 MHz constituting the UL system band having a bandwidth of 40 MHz. The DL system band is constituted of the same number of carrier components as the carrier components constituting the UL system band, and thus it is possible to simplify the correspondence between each of the carrier components constituting the UL system band and the carrier components constituting the DL system band, thereby enabling efficient communication between the base station apparatus and the mobile station apparatus. In other words, in the mobile communication system shown in FIG. 5B, when the base station apparatus and the mobile station apparatus communicate with each other using the wider system band consists of carrier components, the DL system band is constituted of multiple carrier components (for example, the DL system band is constituted of two carrier components) according to the number (for example, two) of carrier components constituting the UL system band, and it is possible to perform a communication such that each of the carrier components correspond to each other (for example, the carrier components constituting the UL system band correspond to the carrier components constituting the DL system band in a direction so as to increase their frequencies).

Here, as described above, how each of the carrier components constituting the UL system band corresponds to one of the carrier components constituting the DL system band can be previously defined such as by specifications. Specifically, the correspondence between the carrier components (UL-1 and UL-2) constituting the UL system band and one of the carrier components (DL-1 and DL-2) constituting the DL system band can be defined such as by specifications. Also, a notification of information (carrier component correspondence information) as to how each of the carrier components constituting the UL system band corresponds to one of the carrier components constituting the DL system band may be given by the base station apparatus to the mobile station apparatus. The base station apparatus transmits, to the mobile station apparatus, the carrier component correspondence information using the broadcast channel (broadcast signal) or the RRC signaling, and thus it is possible to set, to the mobile station apparatus, the carrier component correspondence information cell-specifically or the carrier component correspondence information the mobile station apparatus-dedicatedly.

Here, as described above, how the DL system band and/or the UL system band are consisted of the carrier components can be previously defined such as by specifications. Specifically, how the DL system band is constituted of the carrier components and how the UL system band is constituted of the carrier components can be previously defined such as by specifications. Also, a notification of information (wider frequency band configuration information) as to how the DL system band and/or the UL system band are constituted of the carrier components may be given by the base station apparatus to the mobile station apparatus. The base station apparatus transmits, to the mobile station apparatus, the wider frequency band configuration information using the broadcast channel (broadcast signal) or the RRC signaling, and thus it is possible to set, to the mobile station apparatus, the wider frequency band configuration information cell-specifically or the wider frequency band configuration information the mobile station apparatus-dedicatedly.

Figure 5C:
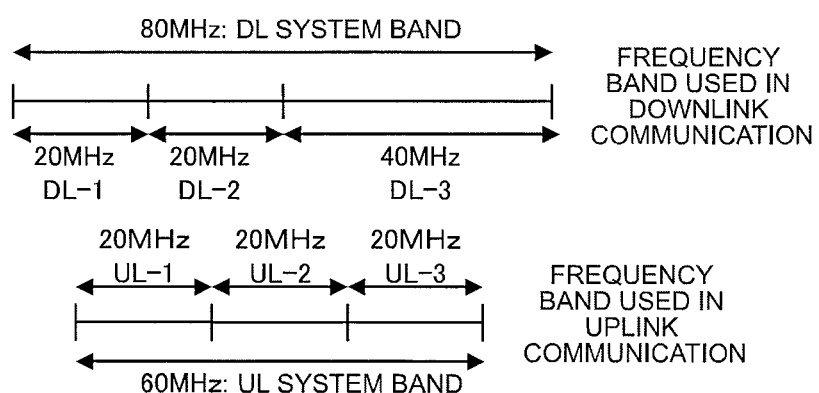
FIG. 5C is a diagram showing an example of the mobile communication system according to the first embodiment.

The configuration of a mobile communication system shown in FIG. 5C will be described. FIG. 5C shows the mobile communication system in which the bandwidth of the frequency band used in the downlink communication (DL system band) is 80 MHz and the bandwidth of the frequency band used in the uplink communication (UL system band) is 60 MHz. In the mobile communication system shown in FIG. 5C, the DL system band is constituted of three carrier components, that is, a carrier component (DL-1) having a bandwidth of 20 MHz, a carrier component (DL-2) having a bandwidth of 20 MHz and a carrier component (DL-3) having a bandwidth of 40 MHz, and the UL system band is constituted of three carrier components (UL-1, UL-2 and UL-3) each having a bandwidth of 20 MHz. The base station apparatus and the mobile station apparatus can communicate with each other (transmission and reception of information) such that the three carrier components constituting the DL system band correspond to the three carrier components constituting the UL system band, respectively. For example, the base station apparatus and the mobile station apparatus communicate with each other such that DL-1, DL-2 and DL-3 correspond to UL-1, UL-2 and UL-3, respectively; the mobile station apparatus can transmit, using UL-1, the ACK/NACK for information (downlink data) transmitted by the base station apparatus using DL-1, and the base station apparatus can transmit, using DL-1, the ACK/NACK for information (uplink data) transmitted by the mobile station apparatus using UL-1.

Here, the mobile communication system shown in FIG. 5C can also be regarded as a mobile communication system that divides a DL system band having a bandwidth of 80 MHz into multiple carrier components (consists of multiple carrier components) such that the DL system band corresponds to the number (three) of carrier components each having a bandwidth of 20 MHz constituting the UL system band having a bandwidth of 60 MHz. The DL system band is constituted of the same number of carrier components as carrier components constituting the UL system band, and thus it is possible to simplify the correspondence between each of the carrier components constituting the UL system band and the carrier components constituting the DL system band, thereby enabling efficient communication between the base station apparatus and the mobile station apparatus. In other words, in the mobile communication system shown in FIG. 5C, when the base station apparatus and the mobile station apparatus communicate with each other using the wider system band consists of carrier components, the DL system band is constituted of multiple carrier components (for example, the DL system band is constituted of three carrier components) according to the number (for example, three) of carrier components constituting the UL system band, and it is possible to perform a communication such that each of the carrier components correspond to each other (for example, the carrier components constituting the UL system band correspond to the carrier components constituting the DL system band in a direction so as to increase their frequencies).

Here, as described above, how each of the carrier components constituting the UL system band corresponds to one of the carrier components constituting the DL system band can be previously defined such as by specifications. Specifically, the correspondence between the carrier components (UL-1, UL-2 and UL-3) constituting the UL system band and the carrier components (DL-1, DL-2 and DL-3) constituting the DL system band can be defined such as by specifications. Also, a notification of information (carrier component correspondence information) as to how each of the carrier components constituting the UL system band corresponds to one of the carrier components constituting the DL system band may be given by the base station apparatus to the mobile station apparatus. The base station apparatus transmits, to the mobile station apparatus, the carrier component correspondence information using the broadcast channel (broadcast signal) or the RRC signaling, and thus it is possible to set, to the mobile station apparatus, the carrier component correspondence information cell-specifically or the carrier component correspondence information the mobile station apparatus-dedicatedly.

Here, as described above, how the DL system band and/or the UL system band are constituted of the carrier components can be previously defined such as by specifications. Specifically, how the DL system band is constituted of the carrier components and how the UL system band is constituted of the carrier components are previously defined such as by specifications. Also, a notification of information (wider frequency band configuration information) as to how the DL system band and/or the UL system band are constituted of the carrier components may be given by the base station apparatus to the mobile station apparatus. The base station apparatus transmits, to the mobile station apparatus, the wide frequency band configuration information using the broadcast channel (broadcast signal) or the RRC signaling, and thus it is possible to set, to the mobile station apparatus, the wide frequency band configuration information cell-specifically or the wide frequency band configuration information the mobile station apparatus-dedicatedly.

Furthermore, in the first embodiment, the base station apparatus and the mobile station apparatus can communicate with each other such that each of the carrier components constituting the UL system band corresponds to the carrier component group including (consists of) multiple carrier components constituting the DL system band. In other words, the base station apparatus and the mobile station apparatus can communicate with each other such that each of multiple uplink carrier components corresponds to each of multiple downlink carrier component groups including multiple downlink carrier components. For example, as shown in FIG. 6A, the base station apparatus and the mobile station apparatus can communicate with each other such that UL-1 and UL-2 correspond to DL-1-1, DL-1-2 included in (constituting) DL-1 and DL-2-1, DL-2-2 and DL-2-3 included in (constituting) DL-2, respectively.

As described above, in the first embodiment, a carrier component consists of multiple carrier components (group) is referred to as a carrier component group. That is, the base station apparatus and the mobile station apparatus can communicate with each other such that each of the carrier components constituting the UL system band corresponds to one of a plurality of carrier component groups constituting the DL system band.

Figure 6A:
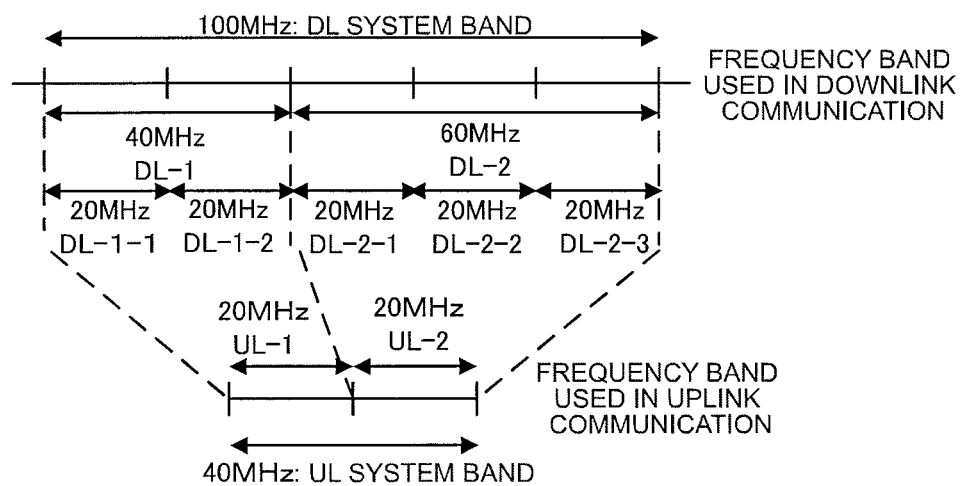
FIG. 6A is a diagram showing an example of the mobile communication system according to the first embodiment.

FIG. 6A shows a mobile communication system in which a bandwidth of a frequency band used in the downlink communication (DL system band) is 100 MHz and a bandwidth of a frequency band used in the uplink communication (UL system band) is 40 MHz. In the mobile communication system shown in FIG. 6A, a carrier component group (DL-1) having a bandwidth of 40 MHz constituting the DL system band is further consists of two carrier components (DL-1-1 and DL-1-2) each having a bandwidth of 20 MHz, and a carrier component group (DL-2) having a bandwidth of 60 MHz constituting the DL system band is further consists of three carrier components (DL-2-1, DL-2-2 and DL-2-3) each having a bandwidth of 20 MHz. In other words, the DL system band is constituted of two carrier component groups (DL-1 and DL-2).

The base station apparatus and the mobile station apparatus can communicate with each other (transmission and reception of information) such that each of the carrier components (UL-1 and UL-2) constituting the UL system band corresponds to multiple carrier component groups (DL-1: DL-1-1 and DL-1-2, DL-2: DL-2-1, DL-2-2 and DL-2-3) constituting the DL system band. For example, the base station apparatus and the mobile station apparatus communicate with each other such that DL-1-1 and DL-1-2 correspond to UL-1 and DL-2-1, DL-2-2 and DL-2-3 correspond to UL-2; the mobile station apparatus can transmit, using UL-1, the ACK/NACK for information (downlink data) transmitted by the base station apparatus using DL-1-1 and DL-1-2, and furthermore, the mobile station apparatus can transmit, using UL-2, the ACK/NACK for information (downlink data) transmitted by the base station apparatus using DL-2-1, DL-2-2 and DL-2-3. Moreover, the base station apparatus can transmit, using DL-1-1 and DL-1-2, the ACK/NACK for information (uplink data) transmitted by the mobile station apparatus using UL-1, and furthermore, the base station apparatus can transmit, using DL-2-1, DL-2-2 and DL-2-3, the ACK/NACK for information (uplink data) transmitted by the mobile station apparatus transmitted using UL-2.

Here, the mobile communication system shown in FIG. 6A can also be regarded as a mobile communication system that divides a DL system band having a bandwidth of 100 MHz into multiple carrier components (consists of multiple carrier component groups) such that the DL system band corresponds to the number (two) of carrier components each having a bandwidth of 20 MHz constituting the UL system band. The DL system band is constituted of the same number of carrier component groups as the carrier components constituting the UL system band, and thus it is possible to simplify the correspondence between each of the carrier components constituting the UL system band and the carrier component group (consists of multiple carrier components) constituting the DL system band, thereby enabling efficient communication between the base station apparatus and the mobile station apparatus. In other words, in the mobile communication system shown in FIG. 6A, when the base station apparatus and the mobile station apparatus communicate with each other using the wider system band consists of carrier components, the DL system band is constituted of multiple carrier component groups (for example, the DL system band is constituted of two carrier component groups) according to the number (for example, two) of carrier components constituting the UL system band, and it is possible to perform a communication such that each of the carrier components constituting the UL system band corresponds to each of the carrier component groups constituting the DL system band (for example, the carrier components constituting the UL system band correspond to the carrier component groups constituting the DL system band in a direction so as to increase their frequencies).

Figure 6B:
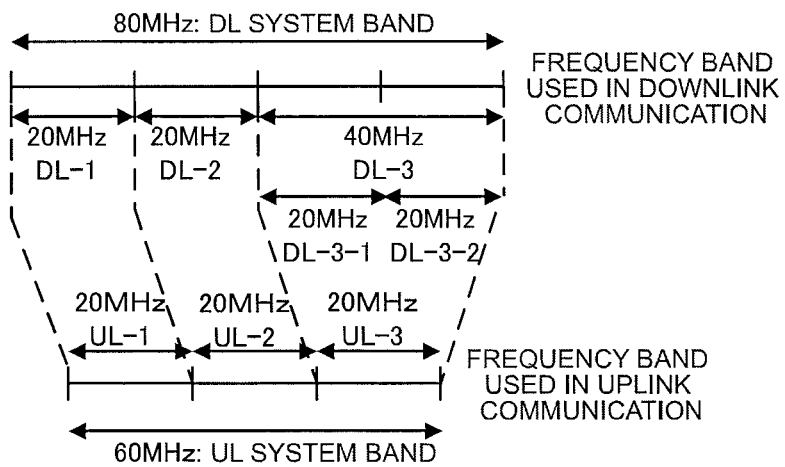
FIG. 6B is a diagram showing an example of the mobile communication system according to the first embodiment.

Likewise, FIG. 6B shows a mobile communication system in which a bandwidth (DL system band) of a frequency band used in the downlink communication is 80 MHz and a bandwidth (UL system band) of a frequency band used in the uplink communication is 60 MHz. In the mobile communication system shown in FIG. 6B, the DL system band is constituted of two carrier components (DL-1 and DL-2) each having a bandwidth of 20 MHz and a carrier component group (DL-3) having a bandwidth of 40 MHz, and the carrier component group (DL-3) having a bandwidth of 40 MHz is further constituted of two carrier components (DL-3-1, and DL-3-2) each having a bandwidth of 20 MHz. In other words, the DL system band is constituted of two carrier components (DL-1 and Dl-2) and one carrier component group (DL-3).

The base station apparatus and the mobile station apparatus can communicate with each other (transmission and reception of information) such that each of the carrier components (UL-1, UL-2 and UL-3) constituting the UL system band corresponds to the carrier components (DL-1, DL-2 and DL-3 (DL-3-1 and DL-3-2)). For example, the base station apparatus and the mobile station apparatus communicate with each other such that DL-1, DL-2 and DL-3-1 and DL-3-2 correspond to UL-1, UL-2 and UL-3, respectively; the mobile station apparatus can transmit, using UL-1, the ACK/NACK for information (downlink data) transmitted by the base station apparatus using DL-1 and further the mobile station apparatus transmits, using UL-3, the ACK/NACK for information (downlink data) transmitted by the base station apparatus using DL-3-1 and DL-3-2. Moreover, for example, the base station apparatus can transmit, using DL-1, the ACK/NACK for information (uplink data) transmitted by the mobile station apparatus using UL-1, and the base station apparatus can transmit, using DL-3-1 and DL-3-2, the ACK/NACK for information (uplink data) transmitted by the mobile station apparatus using UL-3.

Likewise, the mobile communication system shown in FIG. 6B can also be regarded as a mobile communication system that divides a DL system band having a bandwidth of 80 MHz into multiple carrier components and a carrier component group (consists of multiple carrier components and a carrier component group) such that the DL system band corresponds to the number (three) of carrier components each having a bandwidth of 20 MHz constituting the UL system band. The DL system band is constituted of the same number of carrier components as the carrier components constituting the UL system band, and thus it is possible to simplify the correspondence between each of the carrier components constituting the UL system band and the carrier component group, thereby enabling efficient communication between the base station apparatus and the mobile station apparatus.

In other words, in the mobile communication system shown in FIG. 6B, when the base station apparatus and the mobile station apparatus communicate with each other using the wider system band consists of carrier components, the DL system band is constituted of multiple carrier components and a carrier component group (for example, the DL system band is constituted of two carrier components and one carrier component group) according to the number (for example, three) of the carrier components constituting the UL system band, and it is possible to perform communication such that each of the carrier components constituting the UL system band corresponds to each of the carrier components and a carrier component group including multiple carrier components constituting the DL system band (for example, the carrier components constituting the UL system band correspond to the carrier components and a carrier component group including multiple carrier components constituting the DL system band in a direction so as to increase their frequencies).

As described above, also in the mobile communication system shown in FIGS. 6A and 6B, how the carrier components and the carrier component group constituting the DL system band correspond to the carrier components constituting the UL system band can be previously defined such as by specifications. Also, a notification of information (carrier component group correspondence information) as to how the carrier components and the carrier component group constituting the DL system band correspond to the carrier components constituting the UL system band may be given by the base station apparatus to the mobile station apparatus. The base station apparatus transmits, to the mobile station apparatus, the carrier component group correspondence information using the broadcast channel (broadcast signal) or the RRC signaling, and thus it is possible to set, to the mobile station apparatus, the carrier component group correspondence information cell-specifically or the carrier component group correspondence information the mobile station apparatus-dedicatedly.

Here, in the mobile communication system of the first embodiment, the mobile station apparatus can perform communication using one combination of the downlink carrier component and the uplink carrier component among combinations of downlink carrier component groups and the uplink carrier components which correspond to each other so that the base station apparatus and the mobile station apparatus communicate with each other. A description will be given with reference to the mobile communication system shown in FIG. 6A; the mobile station apparatus can perform communication using one combination of the carrier components among combinations of the carrier components, that is, DL-1-1 and UL-1 within the carrier component group DL-1, DL-1-2 and UL-1 within the carrier component group DL-1, DL-2-1 and UL-2 within the carrier component group DL-2, DL-2-2 and UL-2 within the carrier component group DL-2, DL-2-3 and UL-2 within the carrier component group DL-2. Here, one combination of the carrier components used by the mobile station apparatus for communication may vary for each mobile station apparatus present within the mobile communication system; the base station apparatus can communicate with each of the mobile station apparatuses using combinations of the carrier components that vary for each mobile station apparatus (one combination of carrier components that varies for each mobile station apparatus).

Furthermore, for a specific mobile station apparatus among mobile station apparatuses that perform communication using one of combinations of corresponding carrier components, the number of the downlink carrier components corresponding to the uplink carrier components can be limited to be one within the downlink carrier component group (the combinations of the carrier components that can perform communication can be limited). A description will be given with reference to the mobile communication system shown in FIG. 6A; the combinations of the carrier components that can perform communication with a specific mobile station apparatus among mobile station apparatuses that perform communication using combinations of the carrier components, that is, DL-1-1 and UL-1 within the carrier component group DL-1, DL-1-2 and UL-1 within the carrier component group DL-1, DL-2-1 and UL-2 within the carrier component group DL-2, DL-2-2 and UL-2 within the carrier component group DL-2, DL-2-3 and UL-2 within the carrier component group DL-2 can be limited to only one combination of carrier components within each of the carrier component groups (for example, DL-1-1 and UL-1, DL-2-1 and UL-2).

As described above, the combinations of the downlink carrier components and the uplink carrier components that correspond to each other so that the mobile station apparatus performs communication are limited such that one-to-one combination is present within the carrier component group, and thus it is possible to flexibly operate a conventional mobile station apparatus (above-described specific mobile station apparatus among mobile station apparatuses that perform communication using one combination of carrier components, for example, a mobile station apparatus that uses a frequency band having a bandwidth of 20 MHz to perform communication) on an mobile communication system that performs communication using a wider system band (for example, a frequency band having a bandwidth of 100 MHz), with the result that the frequency band can be efficiently used.

Based on the above description, how the LTE-A (LTE-A capable) mobile station apparatus and the LTE (LTE-capable) mobile station apparatus operate will be described in the first embodiment.

For example, in the mobile communication system shown in FIG. 5A, a frequency band (UL system band: 100 MHz) used in the uplink communication and a frequency band (DL system band: 100 MHz) used in the downlink communication are respectively consists of five carrier components each having a bandwidth of 20 MHz, and it is possible to operate the LTE-A mobile station apparatus (it is possible to operate the LTE-A mobile station apparatus on a full system) such that each of the carrier components constituting the UL system band corresponds to one of the carrier components constituting the DL system band (for example, DL-1, DL-2, DL-3, DL-4 and DL-5 correspond to UL-1, UL-2, UL-3, UL-4 and UL-5, respectively).

Furthermore, in the mobile communication system shown in FIG. 5A, one of combinations of five carrier components constituting the frequency band (UL system band: 100 MHz) used in the uplink communication and five carrier components constituting the frequency band (DL system band: 100 MHz) used in the downlink communication is used (for example, DL-1 and UL-1 are used), and thus it is possible to operate the LTE mobile station apparatus having capability of performing communication using a frequency band of a bandwidth of DL: 20 MHz and a bandwidth of UL: 20 MHz (it is possible to operate the LTE mobile station apparatus on a subsystem). Here, one combination of the carrier components used varies for each mobile station apparatus; the base station apparatus can communicate with each of, for example, a mobile station apparatus using DL-1 and UL-1, a mobile station apparatus using DL-2 and UL-2, a mobile station apparatus using DL-3 and UL-3, a mobile station apparatus using DL-4 and UL-4 and a mobile station apparatus using DL-5 and UL-5.

Likewise, as shown in FIG. 5B, a frequency band (UL system band: 40 MHz) used in the uplink communication is constituted of two carrier components each having a bandwidth of 20 MHz, and a frequency band (DL system band: 100 MHz) used in the downlink communication is constituted of two carrier components having a bandwidth of 40 MHz and a bandwidth of 60 MHz, and it is possible to operate the LTE-A mobile station apparatus (it is possible to operate the LTE-A mobile station apparatus on a full system) such that each of the carrier components constituting the UL system band corresponds to one of the carrier components constituting the DL system band (for example, DL-1 and DL-2 correspond to UL-1 and UL-2, respectively).

Furthermore, in the mobile communication system shown in FIG. 5B, one of combinations of two carrier components constituting the frequency band (UL system band: 40 MHz) used in the uplink communication and two carrier components constituting the frequency band (DL system band: 100 MHz) used in the downlink communication is used (for example, DL-1 and UL-1 are used), and thus it is possible to operate the LTE-A mobile station apparatus having capability of performing communication using a frequency band of a bandwidth of DL: 40 MHz and a bandwidth of UL: 20 MHz (it is possible to operate the LTE-A mobile station apparatus on a subsystem). Here, one combination of the carrier components used varies for each mobile station apparatus; the base station apparatus can communicate with each of, for example, a mobile station apparatus that uses DL-1 and UL-1, and having capability of performing communication using a frequency band of a bandwidth of DL: 40 MHz and a bandwidth of UL: 20 MHz, and a mobile station apparatus that uses DL-2 and UL-2, and having capability of performing communication using a frequency band of a bandwidth of DL: 60 MHz and a bandwidth of UL: 20 MHz.

Likewise, as shown in FIG. 5C, a frequency band (UL system band: 60 MHz) used in the uplink communication is constituted of three carrier components each having a bandwidth of 20 MHz, and a frequency band (DL system band: 80 MHz) used in the downlink communication is constituted of three carrier components having a bandwidth of 20 MHz, a bandwidth of 20 MHz and a bandwidth of 40 MHz, and it is possible to operate the LTE-A mobile station apparatus (it is possible to operate the LTE-A mobile station apparatus on a full system) such that each of the carrier components constituting the UL system band corresponds to one of the carrier components constituting the DL system band (for example, DL-1, DL-2 and DL-3 correspond to UL-1, UL-2 and UL-3, respectively).

Furthermore, in the mobile communication system shown in FIG. 5C, one of combinations of three carrier components constituting the frequency band (UL system band: 60 MHz) used in the uplink communication and three carrier components constituting the frequency band (DL system band: 100 MHz) used in the downlink communication is used (for example, DL-1 and UL-1 are used), and thus it is possible to operate the LTE mobile station apparatus having capability of performing communication using a frequency band of a bandwidth of DL: 20 MHz and a bandwidth of UL: 20 MHz (it is possible to operate the LTE mobile station apparatus on a subsystem). Here, one combination of the carrier components used varies for each mobile station apparatus; the base station apparatus can communicate with each of, for example, a mobile station apparatus that uses DL-1 and UL-1, and having capability of performing communication using a frequency band of a bandwidth of DL: 20 MHz and a bandwidth of UL: 20 MHz, a mobile station apparatus that uses DL-2 and UL-2, and having capability of performing communication using a frequency band of a bandwidth of DL: 20 MHz and a bandwidth of UL: 20 MHz, and a mobile station apparatus that uses DL-3 and UL-3, and having capability of performing communication using a frequency band of a bandwidth of DL: 40 MHz and a bandwidth of UL: 20 MHz.

Likewise, as shown in FIG. 6A, a frequency band (UL system band: 40 MHz) used in the uplink communication is constituted of two carrier components each having a bandwidth of 20 MHz, a frequency band (DL system band: 100 MHz) used in the downlink communication is constituted of five carrier components each having a bandwidth of 20 MHz and carrier component groups of 40 MHz and 60 MHz are formed, and thus it is possible to operate the LTE-A mobile station apparatus using a frequency band having a bandwidth of DL: 100 MHz and a bandwidth of UL: 40 MHz (it is possible to operate the LTE-A mobile station apparatus on a full system) such that each of the carrier components constituting the UL system band corresponds to one of the carrier component groups constituting the DL system band (for example, DL-1 and DL-2 correspond to UL-1 and UL-2, respectively).

Furthermore, in the mobile communication system shown in FIG. 6A, one combination of the downlink carrier component and the uplink carrier component, among two carrier components constituting the frequency band (UL system band: 40 MHz) used in the uplink communication and five carrier components included in two carrier component groups constituting the frequency band (DL system band: 100 MHz) used in the downlink communication, is used (for example, DL-1 and UL-1 or DL-2-1 and UL-2 are used), and thus it is possible to operate the LTE mobile station apparatus having capability of performing communication using a frequency band of a bandwidth of DL: 20 MHz and a bandwidth of UL: 20 MHz (it is possible to operate the LTE mobile station apparatus on a subsystem). Here, one combination of the carrier components used varies for each mobile station apparatus; the base station apparatus can communicate with each of, for example, an LTE mobile station apparatus that uses DL-1-1 and UL-1 to perform communication and an LTE mobile station apparatus that uses DL-2-1 and UL-2 to perform communication.

Furthermore, a combination of the carrier components other than any one of combinations of the carrier components included in the uplink carrier components and the downlink carrier component groups used for LTE, is used (for example, DL-1-2 and UL-1 or DL-2-2 and UL-2-3 are used), and thus it is possible to operate the LTE-A mobile station apparatus having capability of performing communication using a frequency band of a bandwidth of DL: 20 MHz and a bandwidth of UL: 20 MHz. Here, one combination of the carrier components used varies for each mobile station apparatus; the base station apparatus can communicate with each of, for example, an LTE-A mobile station apparatus that uses DL-1-2 and UL-1 to perform communication, an LTE-A mobile station apparatus that uses DL-2-2 and UL-2 to perform communication and an LTE-A mobile station apparatus that uses DL-2-3 and UL-2 to perform communication. Here, the LTE-A mobile station apparatus can be regarded as a mobile station apparatus that can perform communication on the uplink carrier component combined with multiple downlink carrier components (carrier component group). The LTE mobile station apparatus can be regarded as a mobile station apparatus that can perform communication on the uplink carrier component combined with one downlink carrier component.

Likewise, as shown in FIG. 6B, a frequency band (UL system band: 60 MHz) used in the uplink communication is constituted of three carrier components each having a bandwidth of 20 MHz, a frequency band (DL system band: 80 MHz) used in the downlink communication is constituted of four carrier components each having a bandwidth of 20 MHz, and carrier components or carrier component groups of 20 MHz, 20 MHz and 40 MHz are formed, and thus it is possible to operate the LTE-A mobile station apparatus using a frequency band having a bandwidth of DL: 80 MHz and a bandwidth of UL: 60 MHz (it is possible to operate the LTE-A mobile station apparatus on a full system) such that each of the carrier components constituting the UL system band corresponds to one of the carrier components or the carrier component groups constituting the DL system band (for example, DL-1, DL-2 and DL-3 correspond to UL-1, UL-2 and UL-3, respectively).

Furthermore, in the mobile communication system shown in FIG. 6B, one of combinations of three carrier components constituting the frequency band (UL system band: 60 MHz) used in the uplink communication and two carrier components and carrier components included in one carrier component group constituting the frequency band (DL system band: 80 MHz) used in the downlink communication, is used (for example, DL-3-1 and UL-3 are used), and thus it is possible to operate the LTE mobile station apparatus having capability of performing communication using a frequency band of a bandwidth of DL: 20 MHz and a bandwidth of UL: 20 MHz (it is possible to operate the LTE mobile station apparatus on a subsystem). Here, one combination of the carrier components used varies for each mobile station apparatus; the base station apparatus can communicate with each of, for example, a mobile station apparatus that uses DL-1 and UL-1 to perform communication, a mobile station apparatus that uses DL-2 and UL-2 to perform communication and a mobile station apparatus that uses DL-3-1 and UL-3 to perform communication.

Furthermore, a combination of the carrier components other than any one of combinations of the carrier components included in the uplink carrier components and the downlink carrier component groups used for LTE, is used (for example, DL-3-2 and UL-3 are used), and thus it is possible to operate the LTE-A mobile station apparatus having capability of performing communication using a frequency band of a bandwidth of DL: 20 MHz and a bandwidth of UL: 20 MHz. Here, one combination of carrier components used varies for each mobile station apparatus; the base station apparatus can communicate with each of, for example, an LTE-A mobile station apparatus that uses DL-3-1 and UL-3 to perform communication and an LTE-A mobile station apparatus that uses DL-3-2 and UL-3 to perform communication. Here, the LTE-A mobile station apparatus can be regarded as a mobile station apparatus that can perform communication on the uplink carrier component combined with multiple downlink carrier components (carrier component group). The LTE mobile station apparatus can be regarded as a mobile station apparatus that can perform communication on the uplink carrier component combined with one downlink carrier component.

Here, it is also possible to simultaneously operate the systems of FIGS. 5B and 6A or the systems of FIGS. 5C and 6B as a system. Specifically, on the system of FIG. 6A, the base station apparatus can communicate with each of, for example, a mobile station apparatus that uses DL-1 and UL-1, and having capability of performing communication using a frequency band of a bandwidth of DL: 40 MHz and a bandwidth of UL: 20 MHz and a mobile station apparatus that uses DL-2 and UL-2, and having capability of performing communication using a frequency band of a bandwidth of DL: 60 MHz and a bandwidth of UL: 20 MHz. On the system of FIG. 6B, the base station apparatus can communicate with each of, for example, a mobile station apparatus that uses DL-1 and UL-1, and having capability of performing communication using a frequency band of a bandwidth of DL: 20 MHz and a bandwidth of UL: 20 MHz, a mobile station apparatus that uses DL-2 and UL-2, and having a bandwidth of DL: 20 MHz and a bandwidth of UL: 20 MHz and a mobile station apparatus that uses DL-3 and UL-3, and having capability of performing communication using a frequency band of a bandwidth of DL: 40 MHz and a bandwidth of UL: 20 MHz.

Furthermore, in the mobile communication system of the first embodiment, a mobile station apparatus having capability of performing communication using a wider system band (DL system band and UL system band) consists of carrier components, can perform communication using one of corresponding combinations of carrier components. In other words, a mobile station apparatus having capability of performing communication using a wider system band, can operate as a mobile station apparatus having capability of performing communication using one combination of carrier components. In other words, a mobile station apparatus that can operate using a wider system band (DL system band and UL system band), can perform communication using only one combination of the carrier components by recognizing that communication is performed using one combination of corresponding carrier components.

For example, in the mobile communication system shown in FIG. 6A, a mobile station apparatus that can perform communication using the DL system band and the UL system band can operate, as a mobile station apparatus performing communication with DL-1-1 and UL-1, by recognizing that communication is performed on DL-1-1 and UL-1. Specifically, an LTE-A mobile station apparatus that can perform communication using the DL system band and the UL system band can operate, as an LTE mobile station apparatus using DL-1-1 and UL-1, by recognizing that communication is performed on DL-1-1 and UL-1 (it is possible to operate the LTE-A mobile station apparatus on a subsystem as an LTE mobile station apparatus).

Here, control information (control signal) for to be recognized the mobile station apparatus as performed communication using one combination of corresponding carrier components (for example, DL-1-1 and UL-1), can be transmitted by the base station apparatus. Specifically, the base station apparatus transmits, the LTE-A mobile station apparatus, the control information (control signal) for performing communication using a limited frequency band (for example, DL-1-1 and UL-1), and the LTE-A mobile station apparatus that has received the signal, can perform communication as the LTE mobile station apparatus using the limited frequency band (for example, DL-1-1 and UL-1) (the base station apparatus can operate the LTE-A mobile station apparatus on the subsystem as the LTE mobile station apparatus by the control signal).

As described above, in the first embodiment, when the base station apparatus and the mobile station apparatus communicate with each other using the wider system band (UL system band and DL system band) consists of the carrier components and/or the carrier component groups, the communication is performed such that each of multiple carrier components constituting the frequency band (UL system band) used in the uplink communication corresponds to each of the carrier components and/or the carrier component groups constituting the frequency band (DL system band) used in the downlink communication. Thus, the base station apparatus and the mobile station apparatus can efficiently communicate with each other without increasing the control information (control signal) from the base station apparatus to the mobile station apparatus.

The mobile station apparatuses (having different capabilities) are operated using any one of combinations of corresponding carrier consists of the UL system band and the carrier components and/or the carrier component groups of the DL system band, and thus a mobile station apparatus having capability of performing communication using a wider frequency band (for example, a frequency band having a bandwidth of 100 MHz) and a mobile station apparatus having capability of performing communication using a narrower frequency band (for example, a frequency band having a bandwidth of 20 MHz) can be flexibly coexisted with the same frequency band, which can realize an efficient mobile communication system.

Second Embodiment

A second embodiment of the present invention will be described. The second embodiment of the present invention can be applied to the mobile communication system in which, as described in the first embodiment, the downlink system band is constituted of multiple carrier components and/or carrier component groups and the uplink system band is constituted of multiple carrier components, and which performs communication such that each of the downlink carrier components and/or the carrier component groups correspond to each of the uplink carrier components, the base station apparatus and the mobile station apparatus. Here, the mobile communication system shown in FIG. 6A will be described as an example; the second embodiment can be applied to all mobile communication systems, the base station apparatuses and the mobile station apparatuses to which the first embodiment can be applied.

Figure 7:
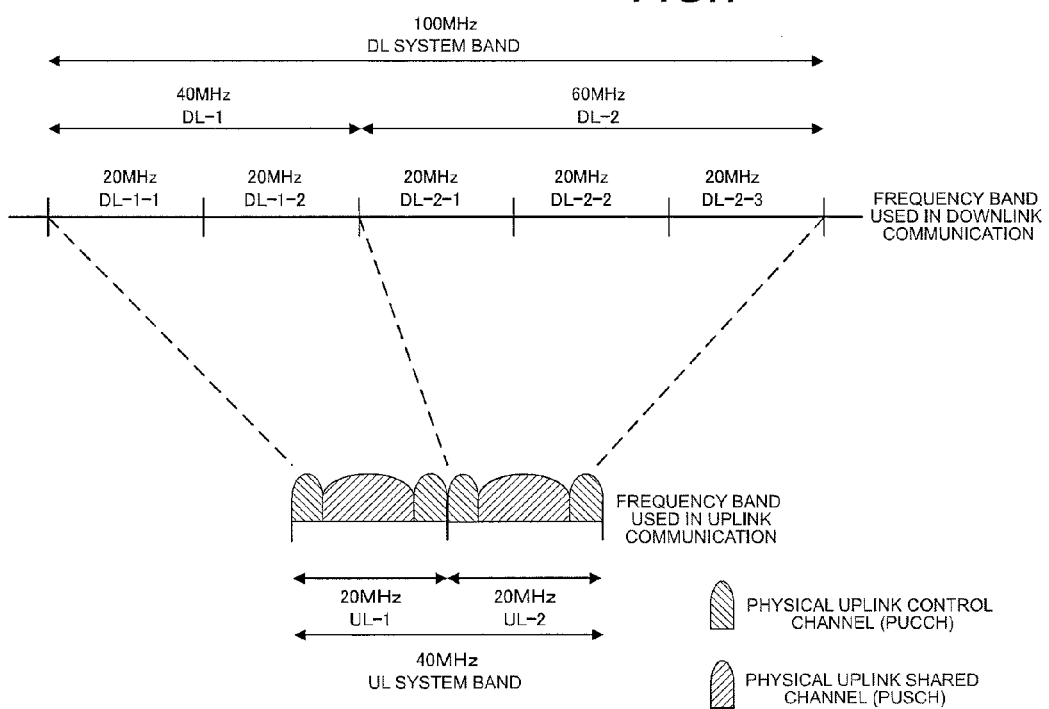
FIG. 7 is a diagram illustrating a second embodiment.

The same mobile communication system as that shown in FIG. 6A is shown in FIG. 7. As described in the first embodiment, in the mobile communication system shown in FIG. 7, the base station apparatus and the mobile station apparatus communicate with each other such that each of multiple carrier components constituting the uplink system band corresponds to one of multiple carrier component groups including multiple carrier components constituting the downlink system band.

FIG. 7 shows that the base station apparatus and the mobile station apparatus communicate with each other such that two carrier components (UL-1: 20 MHz, UL-2: 20 MHz) constituting the UL system band (100 MHz) correspond to two carrier component groups (DL-1: 40 MHz, DL-2: 60 MHz) constituting the DL system band (100 MHz), that is, DL-1 and DL-2 correspond to UL-1 and UL-2, respectively. Here, the carrier component group is constituted of multiple carrier components; as shown in FIG. 7, the carrier component group DL-1 is constituted of the carrier components DL-1-1 and DL-1-2, and the carrier component group DL-2 is constituted of the carrier components DL-2-1, DL-2-2 and DL-2-3. Although, in the second embodiment, as an example of the combination of the carrier component and/or the carrier component group, this type of combination will be described below, the second embodiment can be applied to any combination of the carrier component and/or the carrier component group. For example, the second embodiment can be applied to the mobile communication system shown in FIG. 5A.

In the following description of the second embodiment, for clarification of description, the frequency band (DL system band) used in the downlink communication is expressed to be constituted of multiple carrier component groups including multiple carrier components (consists of multiple carrier components), whereas, when the second embodiment is applied to the mobile communication system shown in FIG. 5A, the frequency band (DL system band) used in the downlink communication is expressed to be constituted of multiple carrier components.

In the mobile communication system shown in FIG. 7, a physical uplink shared channel (hereinafter referred to as a PUSCH) represented by an oblique line extending in an upper right-hand direction and a physical uplink control channel (hereinafter referred to as a PUCCH) represented by an oblique line extending in a lower right-hand direction are allocated on the UL system band used in the uplink communication from the mobile station apparatus to the base station apparatus. Here, the PUSCH and the PUCCH are allocated on each of the carrier components (UL-1 and UL-2) constituting the UL system band. In FIG. 7, the PUCCHs are separately allocated on end portions (edge portions) of each of the carrier components.

As shown in FIG. 7, in the mobile communication system of the second embodiment, the number of the PUSCHs used to transmit data (hereinafter data refers to uplink data (UL-SCH) and/or control data) from the mobile station apparatus to the base station apparatus and the total number of the PUCCHs used to transmit the control data are equal to the number of the carrier components constituting the UL system band, and they vary according to the number of the carrier components constituting the UL system band.

The operation of the base station apparatus and the mobile station apparatus will be described below. The base station apparatus transmits, to the mobile station apparatus, the uplink transmission permission signal including resources allocation information for a physical downlink shared channel (PDSCH), resources allocation information for the physical uplink shared channel (PUSCH) using a physical downlink control channel (PDCCH) on each of multiple downlink carrier component groups (DL-1 and DL-2) consists of the multiple carrier components. Specifically, the base station apparatus performs resources allocation for the PDSCH and transmission of the uplink transmission permission signal using, in the same subframe, the same number of the PDCCHs as the number of the multiple downlink carrier component groups. The mobile station apparatus that has received the uplink transmission permission signal, transmits the data according to the resources allocation information included in the uplink transmission permission signal using the PUSCH on each of the corresponding uplink carrier components (UL-1 and UL-2). Specifically, the mobile station apparatus can transmit the same number of the PUSCHs (data) as the number of the multiple uplink carrier components in the same subframe. In other words, the base station apparatus and the mobile station apparatus can transmit and receive the same number of the uplink transport channels (UL-SCH) as the multiple downlink carrier component groups or the multiple uplink carrier components. The base station apparatus transmits, using the PHICH on each of the multiple corresponding downlink carrier component groups, the ACK/NACK of HARQ for the uplink data transmitted from the mobile station apparatus. That is, the base station apparatus can transmit, in the same subframe, the same number of the ACK/NACKs (PHICHs) of HARQ as the multiple downlink carrier component groups corresponding to the multiple uplink carrier components.

As described above, in the mobile communication system shown in FIG. 7, the base station apparatus transmits the uplink transmission permission signal using the PDCCH on DL-1 (in other words, allocated on DL-1), and the mobile station apparatus that has received the signal, transmits the data using the PUSCH on UL-1 (in other words, allocated on UL-1) corresponding to DL-1. Likewise, the base station apparatus transmits the uplink transmission permission signal using the PDCCH on DL-2 (in other words, allocated on DL-2), and the mobile station apparatus that has received the signal, transmits the data using the PUSCH on UL-2 (in other words, allocated on UL-2) corresponding to DL-2. The base station apparatus transmits the uplink transmission permission signal using the PDCCHs on DL-1 and DL-2 in the same subframe; the mobile station apparatus transmits the data using the PUSCHs of corresponding UL-1 and UL-2 in the same subframe.

Furthermore, the base station apparatus transmits, to the mobile station apparatus, the downlink data (for example, downlink user data) using the PDSCH on each of the multiple downlink carrier component groups (DL-1 and DL-2) consists of multiple carrier components. Specifically, the base station apparatus can transmit, in the same subframe, the same number of the PDSCHs (the downlink data) as the number of the downlink carrier component groups. The mobile station apparatus that has received the downlink data transmitted from the base station apparatus on each of the multiple downlink carrier component groups (DL-1 and DL-2), transmits the ACK/NACK of HARQ for the downlink data using the PUCCH on each of the corresponding uplink carrier components (UL-1 and UL-2). That is, the mobile station apparatus can transmit, in the same subframe, the same number of the ACK/NACKs as the number of the multiple uplink carrier components. In other words, the base station apparatus and the mobile station apparatus can transmit and receive the same number of the downlink transport channels (UL-SCH) as the multiple downlink carrier component groups or the multiple uplink carrier components.

As described above, in the mobile communication system shown in FIG. 7, the base station apparatus transmits the downlink data using the PDSCH on DL-1 (in other words, allocated on DL-1), and the mobile station apparatus transmits the ACK/NACK of HARQ for the downlink data using the PUCCH on UL-1 (in other words, allocated on UL-1) corresponding to DL-1. Likewise, the base station apparatus transmits the downlink data using the PDSCH on DL-2 (in other words, allocated on DL-2), and the mobile station apparatus transmits the ACK/NACK of HARQ for the downlink data using the PUCCH on UL-2 (in other words, allocated on UL-2) corresponding to DL-2. The base station apparatus transmits the downlink data using the PDSCH on DL-1 and DL-2 in the same subframe, and the mobile station apparatus transmits the ACK/NACK of HARQ for the downlink data using the PUCCH on corresponding UL-1 and UL-2 in the same subframe.

Figure 8:
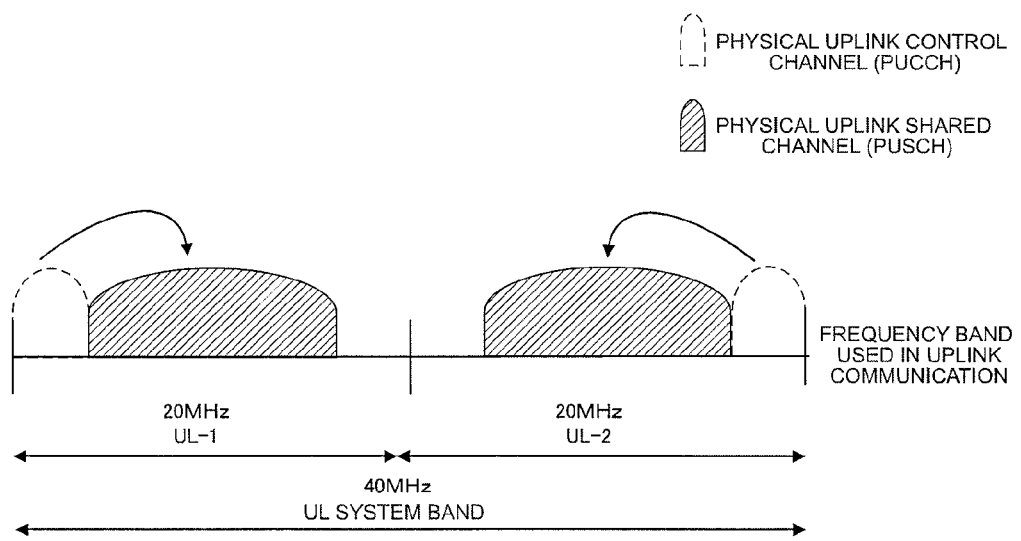
FIG. 8 is a diagram illustrating the operation of the mobile station apparatus.

Here, with reference to FIG. 8, a description will be given of a case where the base station apparatus performs resources allocation for the PUSCH on the uplink carrier components (UL-1 and/or UL-2) when the mobile station apparatus transmits the ACK/NACK of HARQ for the downlink data using the PUCCH on each of the uplink carrier components (UL-1 and UL-2) corresponding to the multiple downlink carrier component groups (DL-1 and DL-2). For clarification of description, in FIG. 8, one PUCCH is shown in each of the uplink carrier components (UL-1 and UL-2). (FIG. 8 illustrates the uplink of a mobile station apparatus in a given slot. In the entire system, the PUCCHs are separately allocated on end portions (edge portions) of each of the uplink carrier components.)

When the ACK/NACK of HARQ for the downlink data transmitted from the base station apparatus on each of the multiple downlink carrier component groups (DL-1 and DL-2) is transmitted using the PUCCH on each of the corresponding uplink carrier components (UL-1 and UL-2), if the base station apparatus performs resources allocation for the PUSCH on the uplink carrier components (UL-1 and/or UL-2), the mobile station apparatus transmits the ACK/NACK using the allocated resources of the PUSCH. Specifically, the base station apparatus allocates the resources of the PUSCH for transmitting the uplink data (UL-SCH) on each of the multiple downlink carrier component groups (DL-1 and DL-2) using the uplink transmission permission signal, and the mobile station apparatus that has received the signal, transmits the ACK/NACK that attempted to be transmitted by the PUCCH on each of the corresponding uplink carrier components (UL-1 and UL-2) using the resources of the PUSCH allocated by the uplink transmission permission signal.

Here, a different format is defined as the uplink transmission permission signal used in each of the multiple downlink carrier component groups (DL-1 and DL-2), and thus it is possible to allocate the resources of the PUSCH for transmitting the uplink data (UL-SCH) using the multiple uplink carrier components.

As described above, when the ACK/NACK of HARQ for the downlink data transmitted on DL-1 from the base station apparatus is transmitted using the PUCCH on the corresponding UL-1, if the base station apparatus performs resources allocation for the PUSCH on UL-1, the mobile station apparatus transmits, using the PUSCH on UL-1, the ACK/NACK that attempted to be transmitted using the PUCCH on UL-1. Likewise, when the ACK/NACK of HARQ for the downlink data transmitted on DL-2 from the base station apparatus is transmitted using the PUCCH on the corresponding UL-2, if the base station apparatus performs resources allocation for the PUSCH on UL-2, the mobile station apparatus transmits, using the PUSCH on UL-2, the ACK/NACK that attempted to be transmitted using the PUCCH on UL-2. The base station apparatus allocates, in the same subframe, the resources of the PUSCH on UL-1 and UL-2 by the uplink transmission permission signal; the mobile station apparatus can transmit in the same subframe, using the resources of the PUSCH allocated by the uplink transmission permission signal, the ACK/NACK that attempted to be transmitted using the PUCCH on UL-1 and UL-2. Here, the mobile station apparatus can transmit either the ACK/NACK only or both the uplink data and the ACK/NACK using the PUSCH on the uplink carrier components (UL-1 and/or UL-2).

An arrow shown in FIG. 8 and extending from the resources of the PUCCH to the resources of the PUSCH indicates that the mobile station apparatus attempted to transmit the ACK/NACK of HARQ for the downlink data using the PUCCH on each of the uplink carrier components (UL-1 and UL-2), transmits the ACK/NACK using the resources of the PUSCH allocated within the same carrier component as the carrier component where the PUCCH is allocated for transmitting the ACK/NACK, according to the resources allocation for the PUSCH from the base station apparatus. That is, in case that the resources of the PUSCH is allocated by the base station apparatus on the carrier component that needs to transmit the ACK/NACK of HARQ for the downlink data, the mobile station apparatus transmits, to the base station apparatus, the ACK/NACK using the allocated resources of the PUSCH.

With reference back to FIG. 7, the base station apparatus, using any one of the multiple downlink carrier component groups (DL-1 and DL-2) consists of the multiple carrier components, allocates by a radio resource control signal (hereinafter referred to as RRC signaling), to the mobile station apparatus, the resources of a physical uplink control channel (hereinafter referred to as PUCCH) used to transmit the channel state information and/or the scheduling request. The mobile station apparatus that has received the signal transmit the channel state information and/or the scheduling request using the allocated PUCCH on the uplink carrier components (UL-1 and/or UL-2). In other words, the base station apparatus can allocate the resources of the PUCCH on the multiple uplink carrier components (UL-1 and UL-2) using the RRC signaling transmitted by any one of multiple downlink carrier component groups (DL-1 and DL-2).

Here, the base station apparatus can transmit, included in the RRC signaling, an uplink carrier component indication information used for indicating which of the uplink carrier components (UL-1 and/or UL-2) the mobile station apparatus uses to transmit the channel state information and/or the scheduling request. In other words, the base station apparatus can transmit, included in the RRC signaling, the uplink carrier component indication information used for indicating which of the PUCCH on UL-1, the PUCCH on UL-2 and the PUCCHs on UL-1 and UL-2 the mobile station apparatus uses to transmit the channel state information and/or the scheduling request. Here, the uplink carrier component indication information may simply and explicitly indicate the number of the carrier component or may implicitly indicate serial numbers that are numbered irrespective of the carrier components and that are given to the frequency resources of each of the PUCCHs. That is, the mobile station apparatus transmits, using the PUCCH on the uplink carrier components (UL-1 and/or UL-2), the channel state information and/or the scheduling request according to the uplink carrier component indication information included in the RRC signaling transmitted by any one of the multiple downlink carrier component groups (DL-1 and DL-2) consists of the multiple carrier components. Here, one PUCCH can be allocated to each of the uplink carrier components, and multiple PUCCHs can be specified to be simultaneously used when the carrier components are different.

In the mobile station apparatus shown in FIG. 7, the base station apparatus transmits, to the mobile station apparatus, the RRC signaling including the uplink carrier component indication information using either of DL-1 and DL-2, and the mobile station apparatus that has received the signal, transmits, to the base station apparatus, the channel state information and/or the scheduling request using the PUCCH on either of UL-1 and UL-2 or UL-1 and UL-2.

Here, with reference to FIG. 8, a description will be given of a case where the base station apparatus performs resources allocation on the PUSCH on the corresponding uplink carrier component (UL-1 and/or UL-2) when the mobile station apparatus transmits the channel state information using the PUCCH on the uplink carrier component (UL-1 and/or UL-2) (in the same subframe as that to be transmitted).

As shown in FIG. 8, when the mobile station apparatus transmits the channel state information using the PUCCH on the uplink carrier component (UL-1 and/or UL-2) according to the RRC signaling from the base station apparatus, if the base station apparatus performs resources allocation for the PUSCH on the corresponding uplink carrier component (UL-1 and/or UL-2), the mobile station apparatus transmits the channel state information using the allocated PUSCH. Specifically, when, in the same subframe as that in which the channel state information is to be transmitted using the PUCCH on UL-1, the transmission using the PUSCH on UL-1 is indicated by the uplink transmission permission signal from the base station apparatus, the mobile station apparatus transmits the channel state information using the resources of the PUSCH on UL-1 allocated by the uplink transmission permission signal, but does not transmit the channel state information using the PUCCH on UL-1.

Likewise, when, in the same subframe as that in which the channel state information is to be transmitted using the PUCCH on UL-2, the transmission using the PUSCH on UL-2 is indicated by the uplink transmission permission signal from the base station apparatus, the mobile station apparatus transmits the channel state information using the resources of the PUSCH on UL-2 allocated by the uplink transmission permission signal, but does not transmit the channel state information using the PUCCH on UL-2. Furthermore, when, in the same subframe as that in which the channel state information is to be transmitted using the PUCCH on UL-1 and UL-2, the transmission using the PUSCH on UL-1 is indicated by the uplink transmission permission signal from the base station apparatus, the mobile station apparatus transmits the channel state information using the resources of the PUSCH on UL-1 allocated by the uplink transmission permission signal and the resources of the PUCCH on UL-2 allocated by the RRC signaling, but does not transmit the channel state information using the PUCCH on UL-1.

Here, the mobile station apparatus transmits the channel state information using the PUSCH on UL-1 and the PUCCH on UL-2 in the same subframe. Likewise, when, in the same subframe as that in which the channel state information is to be transmitted using the PUCCH on UL-1 and UL-2 by the RRC signaling from the base station apparatus, the transmission using the PUSCH on UL-2 is indicated by the uplink transmission permission signal from the base station apparatus, the mobile station apparatus transmits the channel state information using the resources of the PUCCH on UL-1 allocated by the RRC signaling and the resources of the PUSCH on UL-2 allocated by the uplink transmission permission signal, but does not transmit the channel state information on the PUCCH on UL-2. Here, the mobile station apparatus transmits the channel state information using the PUCCH on UL-1 and the PUSCH on UL-2 in the same subframe.

Moreover, when, in the same subframe as that in which the channel state information is to be transmitted using the PUCCH on UL-1 and UL-2 by the RRC signaling from the base station apparatus, the transmission using the PUSCH on UL-1 and UL-2 is indicated by the uplink transmission permission signal from the base station apparatus, the mobile station apparatus transmits the channel state information using the resources of the PUSCH on UL-1 and UL-2 allocated by the uplink transmission permission signal, but does not transmit the channel state information on the PUCCH on UL-1 and UL-2. Here, the mobile station apparatus transmits the channel state information using the PUSCH on UL-1 and UL-2 in the same subframe. Here, the mobile station apparatus can transmit either the channel state information only or both the uplink data and the channel state information using the PUSCH on each of the uplink carrier components (UL-1 and UL-2).

The arrow shown in FIG. 8 and extending from the resources of the PUCCH to the resources of the PUSCH indicates that
the mobile station apparatus that attempted to transmit the channel state information using the PUCCH on the uplink carrier components (UL-1 and/or UL-2), transmit the channel state information using the resources of the PUSCH allocated within the same carrier component as the carrier component where the PUCCH is allocated for transmitting the channel state information, according to the resources of the PUSCH allocated from the base station apparatus. That is, in case that the resources of the PUSCH is allocated by the base station apparatus on the carrier component that needs to transmit the channel state information, the mobile station apparatus transmits, to the base station apparatus, the channel state information using the allocated resources of the PUSCH.

Here, the channel state information and the scheduling request transmitted by the mobile station apparatus to the base station apparatus using the PUCCH on the uplink carrier components (UL-1 and/or UL-2) will be described in further detail (as described above, it is possible to transmit the channel state information using either of the PUCCH and the PUSCH on the uplink carrier components (UL-1 and/or UL-2).

The channel state information will first be described. The mobile station apparatus that has been instructed to transmit the channel state information by the RRC signaling transmitted from the base station apparatus on any of the multiple downlink carrier component groups (DL-1 and DL-2), transmit, to the base station apparatus, the channel state information with respect to the (entire) downlink system band consists of the multiple carrier component groups using the PUCCH on the uplink carrier component (UL-1 and/or UL-2). Specifically, the mobile station apparatus calculates the channel state information with respect to the (entire) downlink system band (DL system band) consists of the multiple downlink carrier component groups (DL-1 and DL-2), and can perform the transmission using the PUCCH (PUSCH, as described above, when allocation by the base station apparatus is performed) on the uplink carrier component (UL-1 and/or UL-2). In other words, the mobile station apparatus can transmit the channel state information with respect to the (entire) downlink system band (DL system band) using the PUCCH on at least one of the uplink carrier components (UL-1 and/or UL-2) according to the RRC signaling transmitted by either of the multiple downlink carrier component groups (DL-1 and DL-2) from the base station apparatus. In other words, the mobile station apparatus can transmit the channel state information with respect to the (entire) downlink system band (DL system band) using the PUCCH on the multiple uplink carrier components (UL-1 and UL-2) according to the RRC signaling transmitted by either of the multiple downlink carrier component groups (DL-1 and DL-2) from the base station apparatus. That is, the channel state information transmitted is required not in the unit of the carrier component but in the unit of the mobile station apparatus.

The scheduling request will now be described. The mobile station apparatus that has been instructed the subframes that can transmit the scheduling request by the RRC signaling transmitted from the base station apparatus on any of the multiple downlink carrier component groups (DL-1 and DL-2), can transmit, to the base station apparatus, the scheduling request (request of UL-SCH transmission) with respect to the (entire) uplink system band consists of the multiple carrier components using the PUCCH on the uplink carrier component (UL-1 and/or UL-2). In other words, the mobile station apparatus can transmit the scheduling request with respect to the (entire) uplink system band (DL system band) using the PUCCH on at least one of the uplink carrier components (UL-1 and/or UL-2) according to the RRC signaling transmitted by either of the multiple downlink carrier component groups (DL-1 and DL-2) from the base station apparatus. In other words, the mobile station apparatus transmits the scheduling request with respect to the (entire) uplink system band (UL system band) using the PUCCH on the multiple uplink carrier components (UL-1 and UL-2) according to the RRC signaling transmitted by either of the multiple downlink carrier component groups (DL-1 and DL-2) from the base station apparatus. That is, the scheduling request transmitted is requested not in the unit of the carrier component but in the unit of the mobile station apparatus.

FIGS. 9A to 9D are diagrams that show, based on what has been described above, the combinations of the uplink channels (the PUSCH and the PUCCH) on which the mobile station apparatus can transmit the data (uplink data (UL-SCH) and/or control data).

As has been described above, the mobile station apparatus can perform, in the same subframe, PUSCH transmission on UL-1 and PUSCH transmission on UL-2, PUCCH transmission on UL-1 and PUSCH transmission on UL-2, PUSCH transmission on UL-1 and PUCCH transmission on UL-2 and PUCCH transmission on UL-1 and PUCCH transmission on UL-2 according to the RRC signaling and the uplink transmission permission signal from the base station apparatus. Here, the RRC signaling from the base station apparatus is transmitted using either of the downlink carrier component groups (DL-1 and DL-2). The uplink transmission permission signals corresponding to the number of the downlink carrier component groups (DL-1 and DL-2 which are also the uplink carrier components (UL-1 and UL-2)) are transmitted.

Figure 9A:
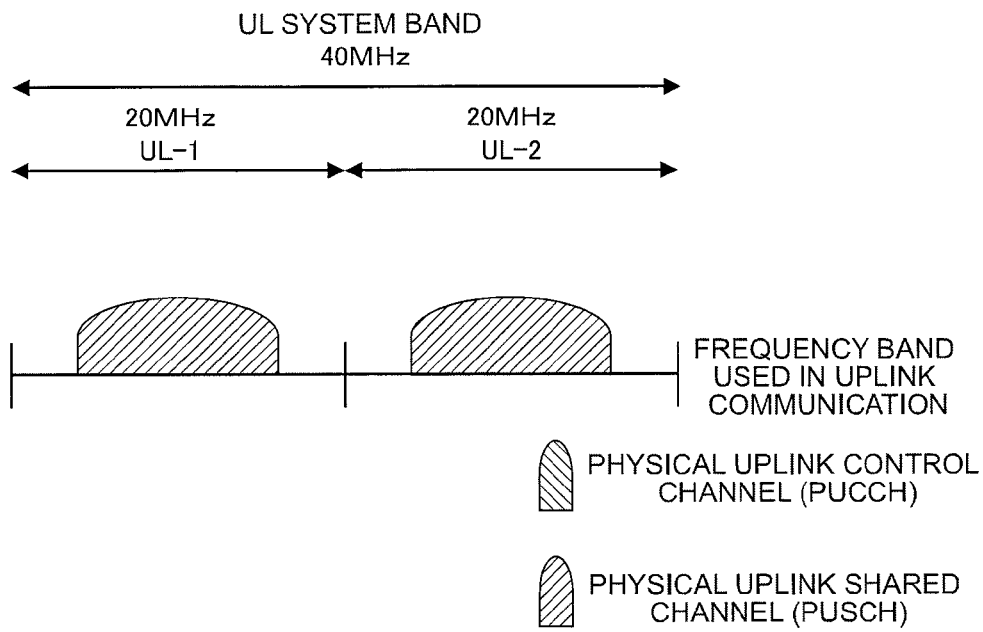
FIG. 9A is a diagram showing an example when the mobile station apparatus transmits data.

Each case will be described. FIG. 9A shows that the PUSCH on UL-1 and the PUSCH on UL-2 are transmitted in the same subframe. The mobile station apparatus transmits, using the PUSCH on each of the corresponding uplink carrier components (UL-1 and UL-2), the data (uplink data (UL-SCH) and/or control data) according to the uplink transmission permission signal transmitted from the base station apparatus on each of the downlink carrier component groups (DL-1 and DL-2). In other words, the mobile station apparatus transmits, to the base station apparatus, the data using the PUSCH on UL-1 according to the uplink transmission permission signal transmitted on DL-1, and transmits, to the base station apparatus, the data using the PUSCH on UL-2 according to the uplink transmission permission signal transmitted on DL-2.

Also, when the PUCCH on UL-1 and UL-2 is used to transmit the ACK/NACK and/or the channel state information and/or the scheduling request, in case that the base station apparatus gives an instruction to perform the transmission using the PUSCH on UL-1 and the PUSCH on UL-2 by the uplink transmission permission signal on DL-1 and DL-2, the data is transmitted using the PUSCH on UL-1 and the PUSCH on UL-2. Here, the ACK/NACK and/or the channel state information and/or the scheduling request which attempted to be transmitted using the PUCCH on UL-1 are transmitted using the PUSCH on UL-1, and the ACK/NACK and/or the channel state information and/or the scheduling request which attempted to be transmitted using the PUCCH on UL-2 are transmitted using the PUSCH on UL-2.

Figure 9B:
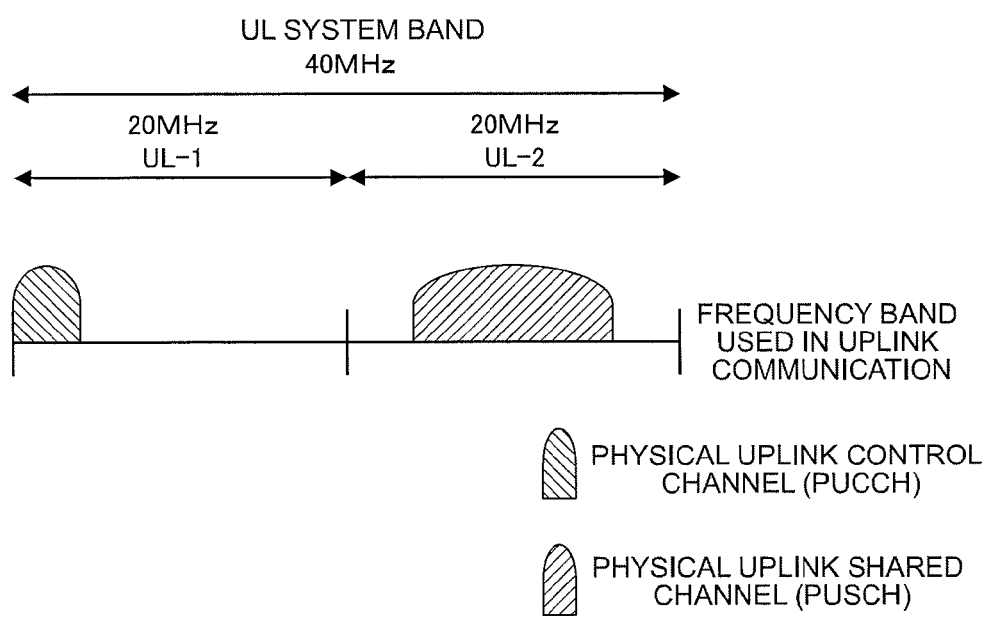
FIG. 9B is a diagram showing an example when the mobile station apparatus transmits data.

FIG. 9B shows that the PUCCH on UL-1 and the PUSCH on UL-2 are transmitted in the same subframe. The mobile station apparatus transmits the data according to the uplink transmission permission signal transmitted on the downlink carrier component group (here, DL-2) using the corresponding PUSCH on UL-2. When the PUCCH on UL-1 and/or UL-2 is used to transmit the ACK/NACK and/or the channel state information and/or the scheduling request, in case that the base station apparatus gives an instruction to perform the transmission using the PUSCH on UL-2 by the uplink transmission permission signal on DL-2, the data is transmitted using the PUCCH on UL-1 and/or the PUSCH on UL-2. Here, the ACK/NACK and/or the channel state information and/or the scheduling request which attempted to be transmitted using the PUCCH on UL-1 are transmitted using the PUCCH on UL-1, and the ACK/NACK and/or the channel state information and/or the scheduling request which attempted to be transmitted using the PUCCH on UL-2 are transmitted using the PUSCH on UL-2.

Figure 9C:
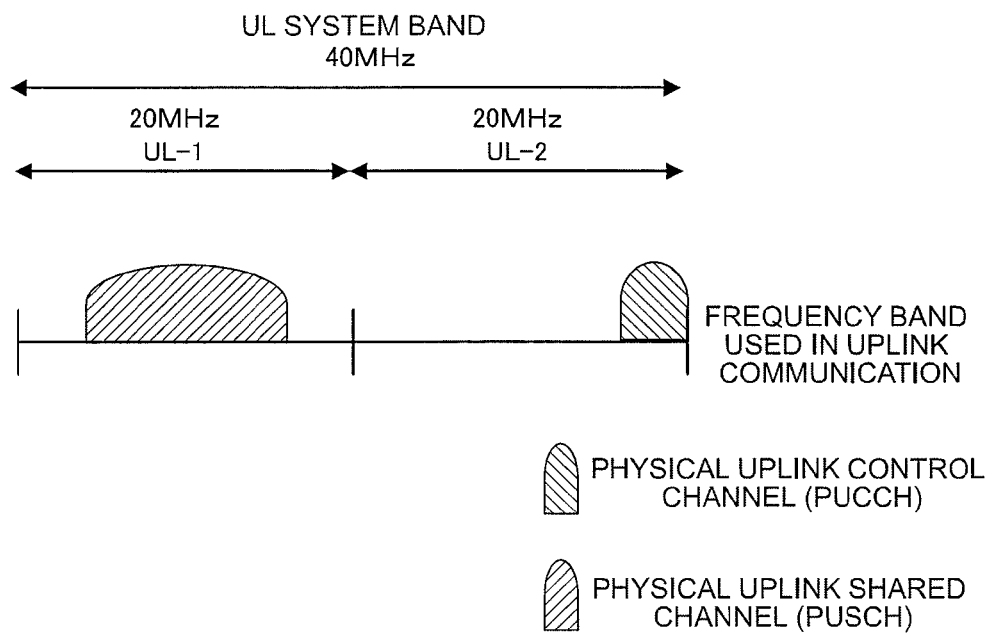
FIG. 9C is a diagram showing an example when the mobile station apparatus transmits data.

FIG. 9C shows that the PUSCH on UL-1 and the PUCCH on UL-2 are transmitted in the same subframe. The mobile station apparatus transmits the channel state information or the scheduling request using the PUSCH on UL-1 according to the uplink transmission permission signal transmitted on the downlink carrier component group (here, DL-1). When the PUCCH on UL-1 and/or UL-2 is used to transmit the ACK/NACK and/or the channel state information and/or the scheduling request, in case that the base station apparatus gives an instruction to perform the transmission using the PUSCH on UL-1 by the uplink transmission permission signal on DL-1, the data is transmitted using the PUSCH on UL-1 and/or the PUSCH on UL-2. Here, the ACK/NACK and/or the channel state information and/or the scheduling request which attempted to be transmitted using the PUCCH on UL-1 are transmitted using the PUSCH on UL-1, and the ACK/NACK and/or the channel state information and/or the scheduling request which attempted to be transmitted using the PUCCH on UL-2 are transmitted using the PUCCH on UL-2.

Figure 9D:
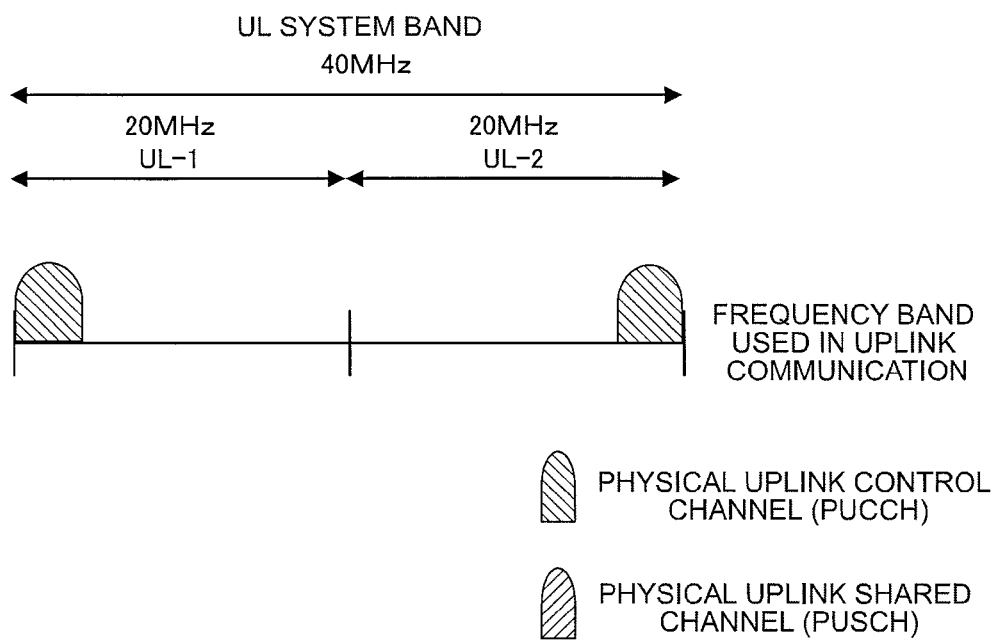
FIG. 9D is a diagram showing an example when the mobile station apparatus transmits data.

FIG. 9D shows that the PUCCH on UL-1 and the PUCCH on UL-2 are transmitted in the same subframe. The mobile station apparatus transmits, using the PUCCH on the uplink carrier component (UL-1 and/or UL-2), the channel state information or the scheduling request according to the RRC signaling transmitted from the base station apparatus on either of the downlink carrier component groups (DL-1 and DL-2). In other words, the mobile station apparatus transmits the channel state information or the scheduling request according the RRC signaling using the PUCCH on UL-1 and/or the PUCCH on UL-2. When the resources of the PUSCH are not allocated on UL-1, the mobile station apparatus transmits the ACK/NACK and/or the channel state information and/or the scheduling request using the PUCCH on UL-1, and when the resources of the PUSCH are not allocated on UL-2, the mobile station apparatus transmits the ACK/NACK and/or the channel state information and/or the scheduling request using the PUCCH on UL-2.

A further detailed description will be given. As with FIGS. 9A to 9D, FIGS. 10A to 10D are diagrams that show how the mobile station apparatus transmits the data (uplink data (UL-SCH) and/or control data) using the uplink channels (the PUSCH and the PUCCH). FIGS. 10A to 10D correspond to FIGS. 9A to 9D, respectively.

FIGS. 10A to 10D are diagrams that show how the mobile station apparatus transmit the data using the uplink channels (the PUSCH and the PUCCH) in a subframe #n. As shown in FIGS. 10A to 10D, the subframe #n is constituted of two slots (here, a slot #a and a slot #a+1), and the mobile station apparatus transmit the data allocated on the PUSCH and/or the PUCCH using one subframe (the same subframe). For example, one subframe (subframe #n) is 1 ms, and is constituted of two 0.5 ms slots (the slot #a and the slot #a+1). Inter-slot hopping is applied to the PUCCH, and the frequency position of the PUCCH is changed in each slot. Inter-slot hopping may be also applied to the PUSCH. However, a pattern shown in FIGS. 9A to 9D is maintained in consideration of a time period of each slot.

Figure 10A:
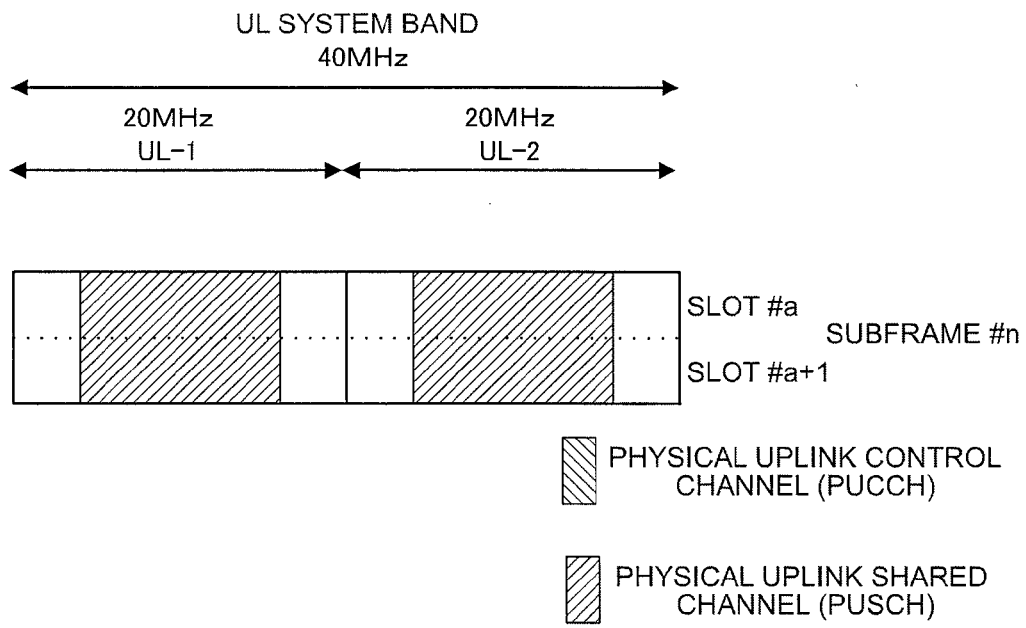
FIG. 10A is a diagram showing another example when the mobile station apparatus transmits data.
Figure 10B:
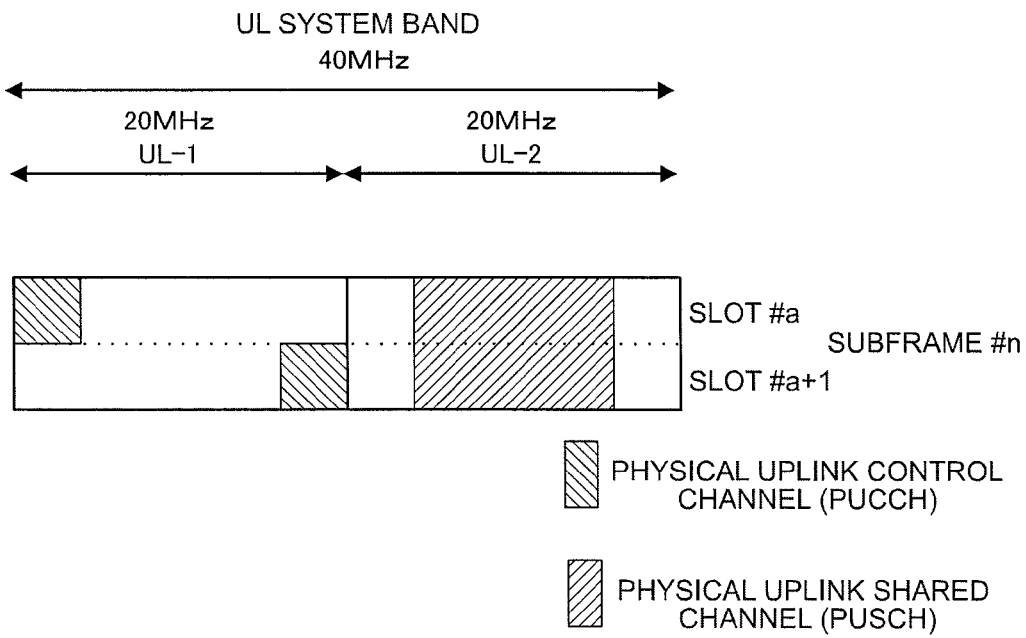
FIG. 10B is a diagram showing another example when the mobile station apparatus transmits data.
Figure 10C:
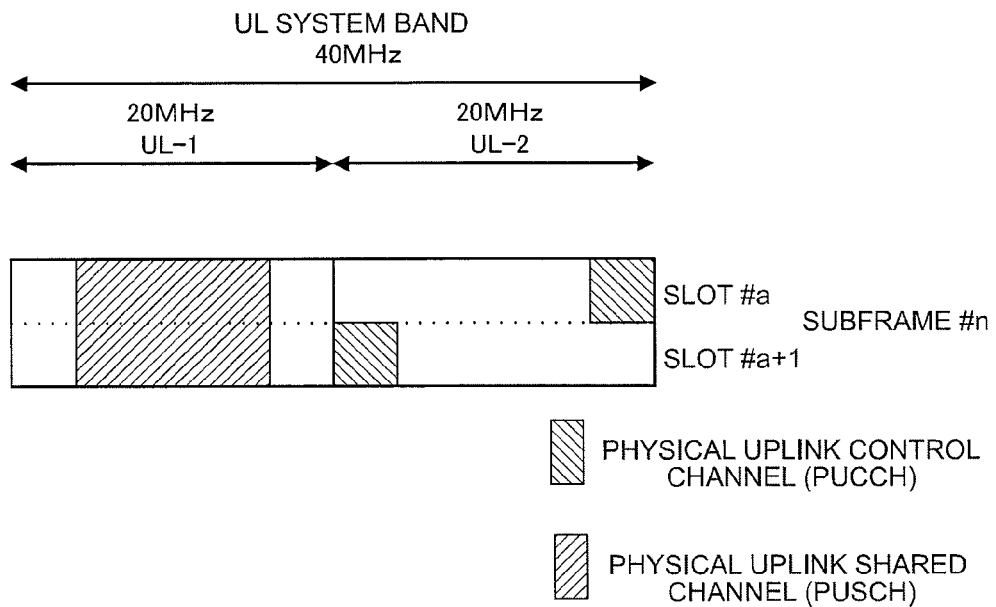
FIG. 10C is a diagram showing another example when the mobile station apparatus transmits data.
Figure 10D:
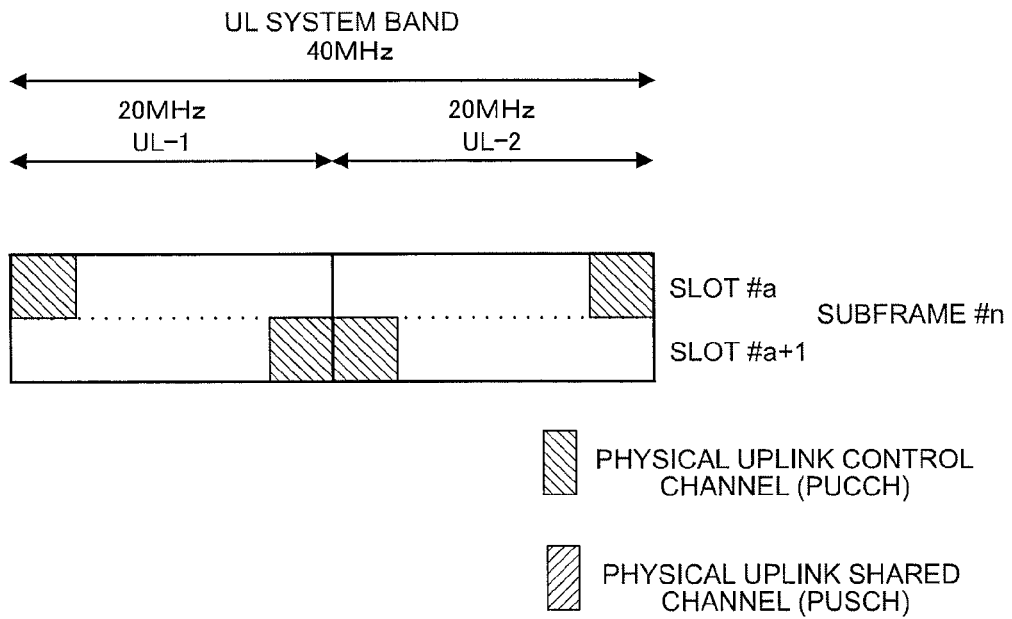
FIG. 10D is a diagram showing another example when the mobile station apparatus transmits data.
Figure 11:
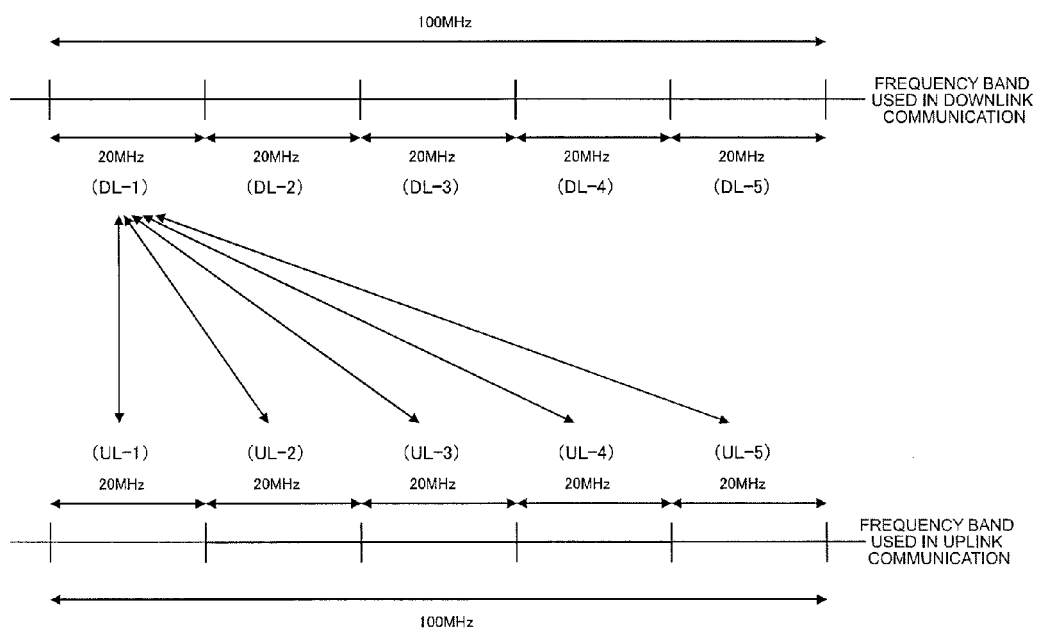
FIG. 11 is a diagram illustrating a conventional technology.

Each case will be described. FIG. 10A corresponding to FIG. 9A, shows that the PUSCH on UL-1 and the PUSCH on UL-2 are transmitted in the same subframe. FIG. 10B corresponding to FIG. 9B, shows that the PUCCH on UL-1 and the PUSCH on UL-2 are transmitted in the same subframe. FIG. 10C corresponding to FIG. 9C, shows that the PUSCH on UL-1 and the PUCCH on UL-2 are transmitted in the same subframe. FIG. 10D corresponding to FIG. 9D shows that the PUCCH on UL-1 and the PUCCH on UL-2 are transmitted in the same subframe.

Here, when the mobile station apparatus transmits, in the subframe #n, the information (the ACK/NACK and/or the channel state information and/or the scheduling information) using the PUCCH on UL-1 and/or UL-2, the mobile station apparatus can perform the transmission while moving (called inter-slot hopping) between the PUCCHs allocated on both end portions (edge portions) of the carrier component (UL-1) corresponding to the two slots (the slot #a and the slot #a+1). In other words, when the mobile station apparatus transmits, in the subframe #n, the information using the PUCCH on UL-1 and/or UL-2, the mobile station apparatus can transmit, in the slot #a, the information by using one (in FIG. 10, the PUCCH allocated on the side of a low frequency of UL-1 and the PUCCH allocated on the side of a high frequency of UL-1) of the PUCCHs allocated in both end portions (edge portions) of the carrier component (UL-1 and/or UL-2), and transmit, in the slot #a+1, the information by using the other (in FIG. 10, the PUCCH allocated on the side of the high frequency of UL-1 and the PUCCH allocated on the side of the low frequency of UL-2).

As described above, the mobile station apparatus transmits, to the base station apparatus, the information (the ACK/NACK and/or the channel state information and/or the scheduling information) using the inter-slot hopping, and thus it is possible to make the information transmitted from the mobile station apparatus to the base station apparatus more resistant to fluctuations in a propagation path (having a diversity effect) and perform transmission.

In FIGS. 10A to 10D, the mobile station apparatus transmits information from the PUCCH allocated on the side of a low frequency of UL-1 and the PUCCH allocated on the side of a high frequency of UL-2 first; on which side the PUCCH is allocated to be first used to transmit the information is different according to the resource allocation on the PUCCH from the base station apparatus.

As has been described above, in the present embodiment, when the base station apparatus and the mobile station apparatus communicate with each other using a wider frequency band (UL system band and DL system band) consists of the carrier components and/or the carrier component groups, the base station apparatus transmits the uplink transmission permission signal using each of the multiple downlink carrier component groups (or the carrier components). The mobile station apparatus that has received the signal, transmits the data (uplink data (UL-SCH) and/or the control data) using the PUSCH on each of the uplink carrier components corresponding to the multiple downlink carrier component groups (or the carrier components), and thus it is possible to perform communication such that each of the carrier component groups (or the carrier components) constituting the downlink system band corresponds to each of the carrier components constituting the uplink system band, which makes it possible to perform communication without increasing the control information (control signal) from the base station apparatus to the mobile station apparatus.

Moreover, the base station apparatus transmits the RRC signaling including the uplink carrier component indication information using any of the multiple downlink carrier component groups (or the carrier components). The mobile station apparatus that has received the signal, transmits, using the PUCCH on the uplink carrier components, the channel state information or the scheduling information according to the uplink carrier component indication information included in the RRC signaling, and thus it is possible to perform communication such that each of the carrier component groups (or the carrier components) constituting the downlink system band corresponds to each of the carrier components constituting the uplink system band, which makes it possible to perform communication without increasing the control information (control signal) from the base station apparatus to the mobile station apparatus.

As described above, the base station apparatus transmits the uplink transmission permission signal and/or the RRC signaling using the downlink carrier component group (or the carrier component), and the mobile station apparatus transmit, to the base station apparatus, the uplink data and/or the control data using the corresponding uplink carrier component, which makes it possible to efficiently perform downlink/uplink communication without increasing the control information (control signal) from the base station apparatus to the mobile station apparatus.

In the present embodiment, the following form can also be employed. The mobile communication system of the present embodiment is a mobile communication system including the base station apparatus and the mobile station apparatus, wherein each of multiple uplink carrier components having part of the bandwidth of a frequency band available for the mobile station apparatus corresponds to each of multiple downlink carrier components or multiple downlink carrier component groups including multiple downlink carrier components having part of the bandwidth of a frequency band available for the base station apparatus, and thus the base station apparatus and the mobile station apparatus communicate with each other.

As described above, each of multiple uplink carrier components having part of the bandwidth of a frequency band available for the mobile station apparatus corresponds to each of multiple downlink carrier components or multiple downlink carrier component groups including multiple downlink carrier components having part of the bandwidth of a frequency band available for the base station apparatus, and thus the base station apparatus and the mobile station apparatus communicate with each other, which makes it possible to achieve efficient information communication without increasing the control information (control signal) notified by the base station apparatus to the mobile station apparatus.

In the mobile communication system of the present embodiment, the base station apparatus and the mobile station apparatus communicate with each other using any one of pairs of the downlink carrier components and the uplink carrier components corresponding to each other.

Since, as described above, the base station apparatus and the mobile station apparatus communicate with each other using anyone of pairs of the downlink carrier components and the uplink carrier components corresponding to each other, it is possible to achieve efficient information communication without increasing the control information notified by the base station apparatus to the mobile station apparatus.

In the mobile communication system of the present embodiment, the base station apparatus transmits, to the mobile station apparatus, the uplink transmission permission signal on each of multiple downlink carrier components, and the mobile station apparatus transmits, to the base station apparatus, uplink information according to the uplink transmission permission signal on each of the uplink carrier components corresponding to the multiple downlink carrier components.

Since, as described above, the base station apparatus transmits, to the mobile station apparatus, the uplink transmission permission signal on each of the multiple downlink carrier components, and the mobile station apparatus transmits, to the base station apparatus, the uplink information according to the uplink transmission permission signal on each of the uplink carrier components corresponding to the multiple downlink carrier components, it is possible to achieve efficient information communication without increasing the control information notified by the base station apparatus to the mobile station apparatus.

In the mobile communication system of the present embodiment, the base station apparatus transmits, to the mobile station apparatus, the uplink transmission permission signal on each of multiple downlink carrier component groups including multiple downlink carrier components, and the mobile station apparatus transmits, to the base station apparatus, uplink information according to the uplink transmission permission signal on each of the uplink carrier components corresponding to the multiple downlink carrier component groups.

Since, as described above, the base station apparatus transmits, to the mobile station apparatus, the uplink transmission permission signal on each of the multiple downlink carrier component groups including the multiple downlink carrier components, and the mobile station apparatus transmits, to the base station apparatus, the uplink information according to the uplink transmission permission signal on each of the uplink carrier components corresponding to the multiple downlink carrier component groups, it is possible to achieve efficient information communication without increasing the control information notified by the base station apparatus to the mobile station apparatus.

In the mobile communication system of the present embodiment, the base station apparatus transmits, to the mobile station apparatus, a radio resource control signal on any one of multiple downlink carrier components, and allocates the resources of a physical uplink control channel for transmitting, by the mobile station apparatus, uplink information on multiple uplink carrier components.

Since, as described above, the base station apparatus transmits, to the mobile station apparatus, the radio resource control signal on any one of multiple downlink carrier components, and allocates the resources of the physical uplink control channel for transmitting, by the mobile station apparatus, uplink information on multiple uplink carrier components, it is possible to achieve efficient information communication without increasing the control information notified by the base station apparatus to the mobile station apparatus.

In the mobile communication system of the present embodiment, the mobile station apparatus transmits, using a physical uplink control channel on multiple uplink carrier components, uplink information according to a radio resource control signal transmitted from the base station apparatus on any one of multiple downlink carrier components.

Since, as described above, the mobile station apparatus transmits, using the physical uplink control channel on multiple uplink carrier components, the uplink information according to the radio resource control signal transmitted from the base station apparatus on any one of multiple downlink carrier components, it is possible to achieve efficient information communication without increasing the control information notified by the base station apparatus to the mobile station apparatus.

In the mobile communication system of the present embodiment, the base station apparatus transmits, to the mobile station apparatus, a radio resource control signal on any one of multiple downlink carrier component groups including multiple downlink carrier components, and allocates the resource of a physical uplink control channel for transmitting, by the mobile station apparatus, uplink information on multiple uplink carrier components.

Since, as described above, the base station apparatus transmits, to the mobile station apparatus, the radio resource control signal on any one of multiple downlink carrier component groups including multiple downlink carrier components, and allocates the resource of a physical uplink control channel for transmitting, by the mobile station apparatus, uplink information on multiple uplink carrier components, it is possible to achieve efficient information communication without increasing the control information notified by the base station apparatus to the mobile station apparatus.

In the mobile communication system of the present embodiment, the mobile station apparatus transmits, using a physical uplink control channel on multiple uplink carrier components, uplink information according to a radio resource control signal transmitted on any one of multiple downlink carrier component groups including multiple downlink carrier components from the base station apparatus.

Since, as described above, the mobile station apparatus transmits, using the physical uplink control channel on multiple uplink carrier components, uplink information according to a radio resource control signal transmitted on any one of multiple downlink carrier component groups including multiple downlink carrier components from the base station apparatus, it is possible to achieve efficient information communication without increasing the control information notified by the base station apparatus to the mobile station apparatus.

In the mobile communication system of the present embodiment, the radio resource control signal includes uplink carrier component indication information for indicating any one of uplink carrier components used by the mobile station apparatus to transmit uplink information among multiple uplink carrier components.

Since, as described above, the radio resource control signal includes uplink carrier component indication information for indicating any one of uplink carrier components used by the mobile station apparatus to transmit uplink information among multiple uplink carrier components, the base station apparatus can give an instruction as to which of the carrier components is used to the mobile station apparatus by the radio resource control signal.

In the mobile communication system of the present embodiment, the mobile station apparatus transmits, to the base station apparatus, uplink information using a physical uplink shared channel.

Since, as described above, the mobile station apparatus transmits, to the base station apparatus, uplink information using a physical uplink shared channel, it is possible to achieve efficient information communication without increasing the control information notified by the base station apparatus to the mobile station apparatus.

In the mobile communication system of the present embodiment, the mobile station apparatus transmits, to the base station apparatus, uplink information using a physical uplink control channel.

Since, as described above, the mobile station apparatus transmits, to the base station apparatus, uplink information using a physical uplink control channel, it is possible to achieve efficient information communication without increasing the control information notified by the base station apparatus to the mobile station apparatus.

In the mobile communication system of the present embodiment, the base station apparatus transmits, to the base station apparatus, downlink information using a physical downlink shared channel.

Since, as described above, the base station apparatus transmits, to the mobile station apparatus, downlink information using a physical downlink shared channel, it is possible to achieve efficient information communication without increasing the control information notified by the base station apparatus to the mobile station apparatus.

In the mobile communication system of the present embodiment, the base station apparatus transmits, to the mobile station apparatus, downlink information using a physical downlink control channel.

Since, as described above, the base station apparatus transmits, to the mobile station apparatus, downlink information using a physical downlink control channel, it is possible to achieve efficient information communication without increasing the control information notified by the base station apparatus to the mobile station apparatus.

In the mobile communication system of the present embodiment, the mobile station apparatus transmits, to the base station apparatus, uplink information using the physical uplink shared channel in case that the transmission of a physical uplink shared channel and the transmission of a physical uplink control channel are occurred in the same subframe of the uplink carrier component.

Since, as described above, the mobile station apparatus transmits, to the base station apparatus, uplink information using the physical uplink shared channel in case that the transmission of a physical uplink shared channel and the transmission of a physical uplink control channel are occurred in the same subframe of the uplink carrier component, it is possible to achieve efficient information communication without increasing the control information notified by the base station apparatus to the mobile station apparatus.

In the mobile communication system of the present embodiment, the mobile station apparatus transmits, to the base station apparatus, channel state information with respect to a downlink system band consists of multiple carrier components and/or multiple carrier component groups using at least one of uplink carrier components.

Since, as described above, the mobile station apparatus transmits, to the base station apparatus, channel state information with respect to a downlink system band consists of multiple carrier components and/or multiple carrier component groups using at least one of uplink carrier components, it is possible to achieve efficient information communication without increasing the control information notified by the base station apparatus to the mobile station apparatus.

In the mobile communication system of the present embodiment, the mobile station apparatus transmits, to the base station apparatus, scheduling request information with respect to an uplink system band consists of multiple carrier components using at least one of uplink carrier components.

Since, as described above, the mobile station apparatus transmits, to the base station apparatus, scheduling request information with respect to an uplink system band consists of multiple carrier components using at least one of uplink carrier components, it is possible to achieve efficient information communication without increasing the control information notified by the base station apparatus to the mobile station apparatus.

The communication method of the present embodiment is a communication method of a mobile communication system including the base station apparatus and the mobile station apparatus, wherein each of multiple uplink carrier components having part of the bandwidth of a frequency band available for the mobile station apparatus corresponds to each of multiple downlink carrier components or multiple downlink carrier component groups including multiple downlink carrier components having part of the bandwidth of a frequency band available for the base station apparatus, and thus the base station apparatus and the mobile station apparatus communicate with each other.

Since, as described above, each of multiple uplink carrier components having part of the bandwidth of a frequency band available for the mobile station apparatus corresponds to each of multiple downlink carrier components or multiple downlink carrier component groups including multiple downlink carrier components having part of the bandwidth of a frequency band available for the base station apparatus, and thus the base station apparatus and the mobile station apparatus communicate with each other, it is possible to achieve efficient information communication without increasing the control information (control signal) notified by the base station apparatus to the mobile station apparatus.

In the embodiments described above, programs for achieving each function in the base station apparatus and each function in the mobile station apparatus are recorded on a computer-readable recording medium and the programs recorded thereon are read and executed by a computer system, and thus the base station apparatus and the mobile station apparatus may be controlled. Here, the "computer system" includes an OS and hardware such as a peripheral device.

The "computer-readable recording medium" refers to a portable medium such as a flexible disk, a magneto-optical disk, a ROM or a CD-ROM and a storage device such as a hard disk incorporated in a computer system. Furthermore, the "computer-readable recording medium" includes: a product that dynamically retains a program for a short period of time such as a communication line used when a program is transmitted through a communication line such as a network, for example, the Internet, or a telephone line; and a product that retains, in the above case, a program for a given period of time such as a volatile memory within a computer system serving as a server or a client. The above program may serve to achieve part of the functions described above; furthermore, the above functions may be achieved by a combination with a program that has already been recorded in a computer system.

Although the embodiments of the present invention are described with reference to the drawings, specific configurations are not limited to these embodiments, and designs and the like are included in the scope of claims without departing from the gist of the present invention.

The invention claimed is:

1. A base station apparatus which communicates with a mobile station apparatus using a plurality of downlink component carriers, the base station apparatus comprising:
  a transmitting unit configured to transmit, to the mobile station apparatus, control information on a physical downlink control channel in a downlink component carrier, the control information being used for scheduling of a physical uplink shared channel in an uplink component carrier, the downlink component carrier being one of the plurality of downlink component carriers; and
  a receiving unit configured to receive, from the mobile station apparatus, uplink data on the physical uplink shared channel in the uplink component carrier scheduled by using the control information, wherein
  the transmitting unit is configured to transmit, to the mobile station apparatus, a positive acknowledgment or a negative acknowledgment for the uplink data, the positive acknowledgment or the negative acknowledgment being transmitted on a physical hybrid ARQ indicator channel in a same downlink component carrier as the downlink component carrier in which the control information is transmitted on the physical downlink control channel.

2. The base station apparatus according to claim 1, wherein
  the control information is used for scheduling of the physical uplink shared channel in the uplink component carrier which is one of a plurality of uplink component carriers.

3. A mobile station apparatus which communicates with a base station apparatus using a plurality of downlink component carriers, the mobile station apparatus comprising:
  a receiving unit configured to receive, from the base station apparatus, control information on a physical downlink control channel in a downlink component carrier, the control information being used for scheduling of a physical uplink shared channel in an uplink component carrier, the downlink component carrier being one of the plurality of downlink component carriers; and
  a transmitting unit configured to transmit, to the base station apparatus, uplink data on the physical uplink shared channel in the uplink component carrier scheduled by using the control information, wherein
  the receiving unit is configured to receive, from the base station apparatus, a positive acknowledgment or a negative acknowledgment for the uplink data, the positive acknowledgment or the negative acknowledgment being received on a physical hybrid ARQ indicator channel in a same downlink component carrier as the downlink component carrier in which the control information is received on the physical downlink control channel.

4. The mobile station apparatus according to claim 3, wherein
  the control information is used for scheduling of the physical uplink shared channel in the uplink component carrier which is one of a plurality of uplink component carriers.

5. A communication method of a base station apparatus which communicates with a mobile station apparatus using a plurality of downlink component carriers, the communication method comprising:
  transmitting, to the mobile station apparatus, control information on a physical downlink control channel in a downlink component carrier, the control information being used for scheduling of a physical uplink shared channel in an uplink component carrier, the downlink component carrier being one of the plurality of downlink component carriers,
  receiving, from the mobile station apparatus, uplink data on the physical uplink shared channel in the uplink component carrier scheduled by using the control information, and
  transmitting, to the mobile station apparatus, a positive acknowledgment or a negative acknowledgment for the uplink data, the positive acknowledgment or the negative acknowledgment being transmitted on a physical hybrid ARQ indicator channel in a same downlink component carrier as the downlink component carrier in which the control information is transmitted on the physical downlink control channel.

6. The communication method according to claim 5, wherein
  the control information is used for scheduling of the physical uplink shared channel in the uplink component carrier which is one of a plurality of uplink component carriers.

7. A communication method of a mobile station apparatus which communicates with a base station apparatus using a plurality of downlink component carriers, the communication method comprising:
  receiving, from the base station apparatus, control information on a physical downlink control channel in a downlink component carrier, the control information being used for scheduling of a physical uplink shared channel in an uplink component carrier, the downlink component carrier being one of the plurality of downlink component carriers,
  transmitting, to the base station apparatus, uplink data on the physical uplink shared channel in the uplink component carrier scheduled by using the control information, and
  receiving, from the base station apparatus, a positive acknowledgment or a negative acknowledgment for the uplink data, the positive acknowledgment or the negative acknowledgment being received on a physical hybrid ARQ indicator channel in a same downlink component carrier as the downlink component carrier in which the control information is received on the physical downlink control channel.

8. The communication method according to claim 7, wherein
the control information is used for scheduling of the physical uplink shared channel in the uplink component carrier which is one of a plurality of uplink component carriers.

* * * * *